(12) United States Patent
Nagao

(10) Patent No.: US 11,645,410 B2
(45) Date of Patent: May 9, 2023

(54) CONTENT MANAGEMENT SYSTEMS AND METHODS

(71) Applicant: Intertrust Technologies Corporation, Sunnyvale, CA (US)

(72) Inventor: Yutaka Nagao, San Jose, CA (US)

(73) Assignee: Intertrust Technologies Corporation, Milipitas, CA (US)

(*) Notice: Subject to any disclaimer, the term of this patent is extended or adjusted under 35 U.S.C. 154(b) by 0 days.

(21) Appl. No.: 17/200,251

(22) Filed: Mar. 12, 2021

(65) Prior Publication Data

US 2021/0200892 A1 Jul. 1, 2021

Related U.S. Application Data

(63) Continuation-in-part of application No. 17/067,394, filed on Oct. 9, 2020.

(60) Provisional application No. 62/913,016, filed on Oct. 9, 2019, provisional application No. 63/089,517, filed on Oct. 8, 2020, provisional application No. 63/105,070, filed on Oct. 23, 2020.

(51) Int. Cl.
| | |
|---|---|
| *G06F 21/62* | (2013.01) |
| *H04L 9/06* | (2006.01) |
| *H04L 9/32* | (2006.01) |
| *H04L 9/00* | (2022.01) |

(52) U.S. Cl.
CPC ........ *G06F 21/6227* (2013.01); *H04L 9/0643* (2013.01); *H04L 9/3297* (2013.01); *H04L 9/50* (2022.05); *H04L 2209/603* (2013.01)

(58) Field of Classification Search
None
See application file for complete search history.

(56) References Cited

U.S. PATENT DOCUMENTS

| | | |
|---|---|---|
| 10,320,569 B1 | 6/2019 | Wentz et al. |
| 10,938,791 B1 * | 3/2021 | Munson ................. H04L 65/80 |
| 2003/0041250 A1 | 2/2003 | Proudler |
| 2005/0193043 A1 | 9/2005 | Hoover |

(Continued)

FOREIGN PATENT DOCUMENTS

| | | |
|---|---|---|
| WO | 2002025409 | 3/2002 |
| WO | 20130059368 | 4/2013 |

(Continued)

OTHER PUBLICATIONS

International Search Report—International Application No. PCT/US2021/022213 (6 pgs).

(Continued)

*Primary Examiner* — Benjamin E Lanier
(74) *Attorney, Agent, or Firm* — John P. Davis; Thayne and Davis LLC

(57) ABSTRACT

This disclosure relates to, among other things, systems and methods for managing electronic content. Certain embodiments disclosed herein provide for a trusted data management platform that may interact with a trusted assertion service and/or a digital rights management service to manage access to and/or use of electronic content. Content creators and/or other content rights holder may register their (Continued)

content and/or associate rights using the trusted data management platform and/or a trusted assertion service and be assured that their content rights are securely managed and respected.

17 Claims, 18 Drawing Sheets

(56) References Cited

U.S. PATENT DOCUMENTS

| | | | |
|---|---|---|---|
| 2006/0282441 | A1 | 12/2006 | Weller et al. |
| 2009/0165099 | A1 | 6/2009 | Eldar et al. |
| 2017/0206523 | A1 | 7/2017 | Goeringer et al. |
| 2018/0232526 | A1* | 8/2018 | Reid ................ H04L 9/3213 |
| 2019/0057115 | A1 | 2/2019 | Liu et al. |
| 2019/0361867 | A1 | 11/2019 | Nilsson et al. |
| 2022/0060514 | A1* | 2/2022 | Hu ..................... H04L 63/06 |

FOREIGN PATENT DOCUMENTS

| | | | | |
|---|---|---|---|---|
| WO | WO-2018032890 | A1 * | 2/2018 | ......... G06F 16/1834 |
| WO | WO-2020244231 | A1 * | 12/2020 | ........... G06F 16/152 |

OTHER PUBLICATIONS

Written Opinion of the International Search Authority—International Application No. PCT/US2021/022213 (13 pgs).
Miao et al. Digital Copyright Works Management System Based on DOSA. Computer Science and Application Engineering. pp. 1-9. Oct. 22, 2018. (9 pgs).
Qureshi et al. Blockchain-based P2P multimedia content distribution using collusion-resistant fingerprint. 2019 Asia-Pacific Signal and Information Processing Association Annual Summit and Conference (APSIPA ASC). IEEE. pp. 1606-1615. Nov. 18, 2019. (10 pgs).
International Search Report—International Application No. PCT/US2020/055115 (5 pgs).
Written Opinion of the International Search Authority—International Application No. PCT/US2020/055115 (7 pgs).
Non-Final Office Action dated May 13, 2022, issued in U.S. Appl. No. 17/067,394, (14 pgs).
Final Office Action dated Aug. 23, 2022, issued in U.S. Appl. No. 17/067,394 (15 pgs).
Advisory Action dated Oct. 31, 2022, issued in U.S. Appl. No. 17/067,394 (3 pgs).
Official Communication from the European Patent Office dated May 17, 2022, issued in U.S. Appl. No. 17/067,394-1218 (3 pgs).
Non-Finai Office Action dated Dec. 6, 2022, issued in U.S. Appl. No. 17/067,394. (17 pgs).

* cited by examiner

CONTENT MANAGEMENT SYSTEMS AND METHODS

RELATED APPLICATIONS

This application is a continuation-in-part of U.S. patent application Ser. No. 17/067,394, filed on Oct. 9, 2020, and entitled "Trusted Data Management Systems and Methods," which claims the benefit of priority under 35 U.S.C. § 119(e) to U.S. Provisional Patent Application No. 62/913,016, filed Oct. 9, 2019, and entitled "Trusted Data Management Systems and Methods," and to U.S. Provisional Patent Application No. 63/089,517, filed Oct. 8, 2020, and entitled "Content Management Systems and Methods." This application further claims benefit of priority under 35 U.S.C. § 119(e) to U.S. Provisional Patent Application No. 63/089,517, filed Oct. 8, 2020, and entitled "Content Management Systems and Methods," and to U.S. Provisional Patent Application No. 63/105,070, filed Oct. 23, 2020, and entitled "Content Management Systems and Methods." The contents of each of the foregoing applications are incorporated hereby by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing electronic content and associated rights. More specifically, but not exclusively, the present disclosure relates to systems and methods for providing trust in a content management ecosystem.

A number of parties and/or entities may interact in a data management and/or processing ecosystem. For example, data providers may generate data, aggregate data, and/or provide data to one or more other systems and/or services. Data processors may perform various operations on and/or using data to generate new, processed, and/or derived data sets. For example and without limitation, data processors may clean and/or filter data, reformat data, anonymize data, and/or generate other derived and/or aggregated datasets. In this manner, data processors may add certain value to associated data from the perspective of data consumers.

Data consumers may purchase and/or otherwise access data managed by a data management platform and/or an associated data marketplace for use in a variety of contexts. Data owners, providers, processors, and/or other stakeholders may have an interest in ensuring that data usage, access, and/or distribution is governed securely. In addition, data consumers may be interested in ensuring the data that they consume is authentic and/or otherwise can be trusted. Conventional data marketplaces, however, may not provide robust and/or trusted mechanisms for verifying the integrity, provenance, and/or chain-of-handling of data.

Embodiments of the disclosed systems and methods provide for a trusted data management architecture that may allow for data providers and/or processors to securely record information relating to data provenance and/or chain-of-handling. Data consumers may access and/or use such recorded information to authenticate and/or other verify the provenance, chain-of-handling, and/or other assertions relating to data. Recorded information relating to data, which may in certain instances be referred to herein as assertions, data assertions, trusted assertions, and/or derivatives thereof, may be securely recorded by a trusted assertion service that may interact with data consumers in connection with data verification processes.

In various embodiments, a trusted data management architecture may be implemented, at least in part, using a trusted data management platform and/or multiple trusted data management platforms. The trusted data management platform may ingest original data generated and/or otherwise provided by a data provider. Assertions associated with the original data may be recorded with a trusted assertion service by the data provider and/or the trusted data management platform. In some embodiments, the assertions associated with the original data may be cryptographically signed with a key associated with the data provider and/or a key associated with the trusted data management platform, thereby creating a trusted cryptographic association between the recorded assertion and/or the particular data provider and/or trusted data management platform.

One or more data processors may provide one or more programs to the trusted data management architecture that may be configured to operate on, transform, and/or otherwise process data within the trusted data management architecture to generate processed data sets. In various embodiments, assertions associated with the processed data sets may be recorded with the trusted assertion service by the trusted data management platform and/or the associated data processor. Data consumers may access the assertions recorded by the trusted assertion service to authenticate and/or otherwise verify the provenance, chain-of-handling, and/or other information associated with original and/or processed data sets accessed from the trusted data management platform and/or associated data marketplaces.

Although various embodiments are described herein as having assertions being generated and transmitted to a trusted assertion service from one or more trusted data management platforms, it will be appreciated that various processes, including assertion recordation and verification processes, may in further embodiments be performed directly by data providers, processors, and/or consumers.

In some embodiments, a method for managing electronic data performed by a trusted data management platform may include accessing a first data set and processing the first data set using a data processing program executing within a secure execution environment of the trusted data management platform to generate a second data set (e.g., in response to a request from an associated service). In some embodiments, the first data set may be received from a data provider system. The data processing program may be received from a data processing service separate from the trusted data management platform for execution within the secure execution environment of the platform.

Fact information associated with the second data set may be generated and stored. The fact information may comprise, for example and without limitation, one or more of a hash of the first data set, a hash of the second data set, identification information associated with the data processing program and/or the data processing service, a hash of the data processing program, a timestamp associated with the generation of the second data set by the data processing program, configuration information associated with the generation of the second data set by the data processing program, and/or information describing at least one data transformation operation performed by the data processing program. In some embodiments, the fact information may be securely stored with the second data set or in a separate database from the second data set by the trusted data management platform.

An assertion may be generated based on the fact information. In some embodiments, assertion may comprise, for example and without limitation, one or more of a hash of the fact information, a digital signature generated using a first cryptographic key securely associated with the trusted data management platform, a digital signature generated using a second cryptographic key securely associated with the data processing service and/or a digital signature generating using a third cryptographic key securely associated with the data processing program. The platform may transmit the generated assertion to a trusted assertion service separate from the platform for recordation.

In certain embodiments, the trusted data management platform may expose a data marketplace interface to a data consumer system. The platform may receive a data request from the data consumer system for the second data set. In response to this request (e.g., after authenticating any requisite rights), the platform may transmit the second data set and the fact information to the data consumer system.

Various aspects of the disclosed systems and methods may be further be used in connection with managing data that includes electronic content and/or related data and/or associated rights. Electronic content may comprise, for example and without limitation, audio, video, written, and/or image content. Content generators, owners, and/or other parties having rights to content including may have an interest in ensuring that rights to their content and/or associated data are respected. Content publishers and/or other entities participating in a content ecosystem (e.g., a performance rights organization ("PRO")) may be interested in ensuring that the content they publish and/or otherwise interact with is authentic and that they respect the rights of content generators, owners, and/or other parties having interests in the content. Content consumers may share similar interests in ensuring that the content they consume is authentic and that rights of various participants in the content ecosystem are respected.

Embodiments of the disclosed systems and methods may provide robust and/or trusted mechanisms for managing content and/or verifying the integrity, provenance, and/or chain-of-handling of content and/or associated data. In various embodiments, a content creator and/or other entity having certain rights to content may interact with trusted data management platform and/or multiple trusted data management platforms to securely register information regarding their associated content rights. For example, in some embodiments, a trusted data management platform may generate secure bindings and/or associated hash bindings associating content, content metadata and/or other associated information, content and/or content rightsholder (e.g., a content creator) identification information, and/or timestamp information. The secure bindings and/or associated hash bindings may be recorded (e.g., recorded as an assertion) with a trusted assertion service maintaining a ledger of associated bindings and/or hash bindings.

Parties interested in verifying the integrity, provenance, and/or chain-of-handling of content and/or associated data may query the trusted assertion service to determine whether certain bindings and/or hash bindings are recorded in the ledger. For example, in some embodiments, a PRO may interact with the trusted data management platform to identify whether certain assertions associated with content have been recorded by the trusted assertion service and ascertain information relating to rights associated with content. In various further embodiments, a digital rights management ("DRM") service may interact with the trusted data management platform and/or the trusted assertion service to verify and/or otherwise manage rights associated with content.

BRIEF DESCRIPTION OF THE DRAWINGS

The inventive body of work will be readily understood by referring to the following detailed description in conjunction with the accompanying drawings, in which.

DETAILED DESCRIPTION

A description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to certain drawings. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods provide for a trusted data management architecture that may allow for data providers and/or processors to securely record information relating to data provenance and/or chain-of-handling, while also allowing for data consumers to authenticate and/or otherwise validate data they receive using such information in a trusted manner. Various aspects of the disclosed embodiments may, in some instances, be implemented using one or more trusted data management platforms.

A trusted data management platform may establish trusted relationships with various data ecosystem stakeholders including, for example and without limitation, one or more data providers, data processors, trusted assertion services, data marketplace services, and/or data consumers. Various information associated with generated and/or processed data and/or datasets may be recorded with a trusted assertion service, allowing data consumers to later use such recorded information in connection with data authentication and/or validation activities.

Figure 1:
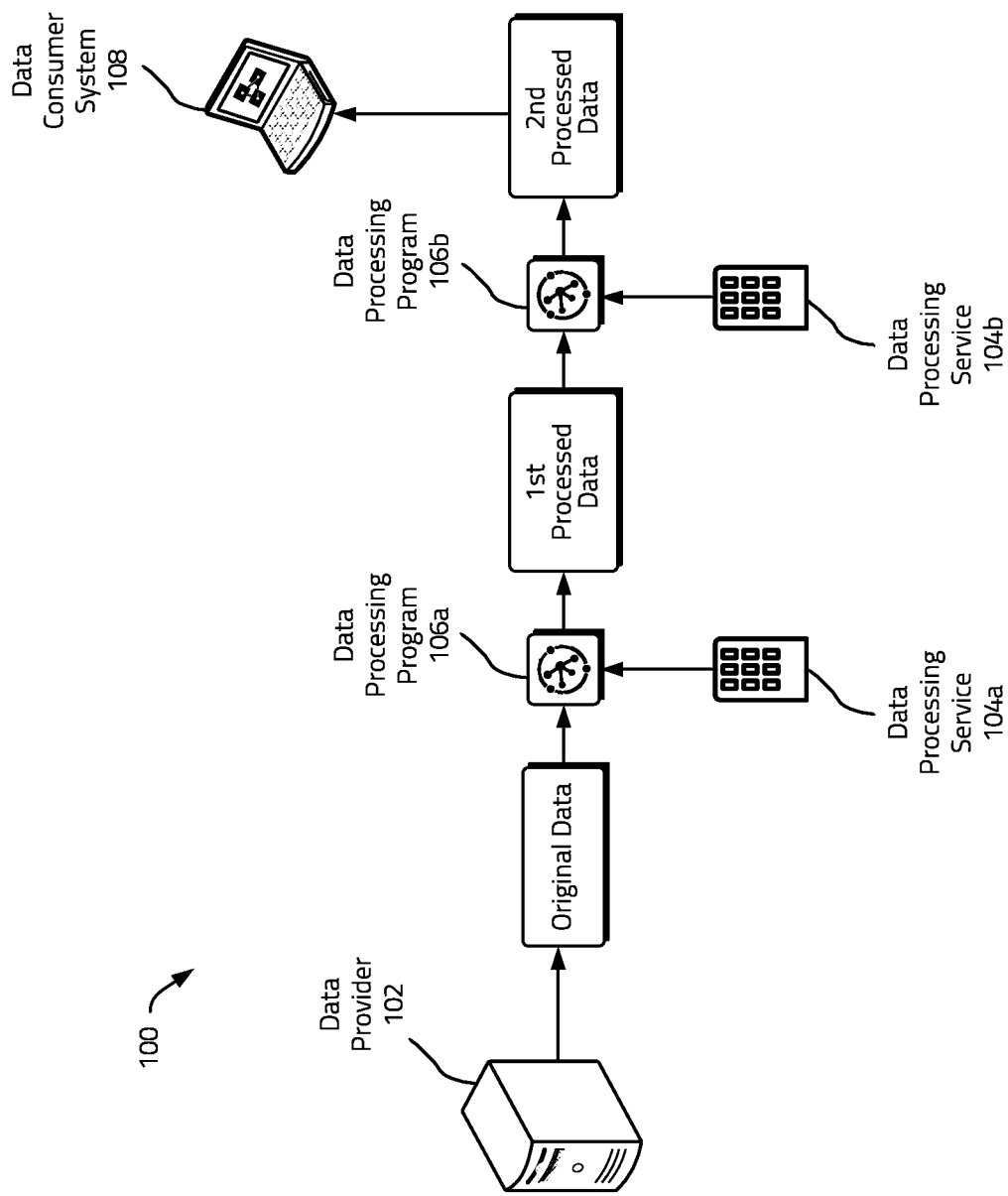
FIG. 1 illustrates an example of a data management architecture consistent with various embodiments of the present disclosure.

FIG. 1 illustrates an example of a data management architecture 100 consistent with various embodiments of the present disclosure. As illustrated, a data provider 102 (and/or a system associated with a data provider) may generate and/or otherwise provide data for ingestion into the data management architecture 100. In various examples described herein and illustrated in the figures, data provided by a data provider 102 may be generally referred to as original data and/or raw data. Although described herein as original data, such data may generally comprise any data provided by a data provider 102 for inclusion within the data management architecture 100 and may not necessarily be raw and/or otherwise unprocessed data. For example, original data provided by the data provider 102 may comprise data that has been processed in some manner by the data provider 102 and/or one or more other entities.

In some embodiments, the data provider 102 may generate the original and/or raw data. In further embodiments, the original data may be generated by another entity and/or another data provider and may be provided to the data provider 102 for aggregation and/or ingestion into the data management architecture 100.

A variety of types and/or formats of data may be used in connection with various aspects of the disclosed embodiments including, for example and without limitation, various system and/or sensor data, user related data, personal data, health data, environmental data, business data, and/or any other type and/or types of data in any suitable format. Accordingly, it will be appreciated that the term "data" and/or "data set" as used herein should not be considered as being limited to a particular type and/or format of data, but may instead encompasses a wide variety of types of data in a wide variety of data formats.

One or more data processing services 104a, 104b may be interested in processing the original data and/or data derived from the original data to generate processed data and/or associated data sets. For example, as illustrated, a first data processing service 104a may use a first data processing program 106a to process the original data and generate corresponding first processed data. Similarly, a second data processing service 104b may use a second data processing program 106b to further process the first processed data to generate second processed data.

Although the illustrated examples show two data processing services 104a, 104b and/or associated data processing programs 106a, 106b configured to generate two corresponding processed data sets, it will be appreciated that any suitable number of data processing services 104a may engage in connection with various aspects of the disclosed data management ecosystem using any suitable number of data processing programs generating any number of process data sets. For example and without limitation, a single data processing service may be associated with and/or use multiple data processing programs. Moreover, in various embodiments, a single data processing program may operate on data (e.g., original and/or previously processed data) to generate multiple processed data sets. Therefore, it will be appreciated that various aspects of the illustrated ecosystems and/or architectures included herein are provided for purposes of illustration and explanation and not limitation.

Consistent with various aspects of the disclosed embodiments, data processing programs 106a, 106b may perform a variety of data processing activities, operations, and/or actions including, for example and without limitation, one or more:

Data Filtering Operations—Data may be filtered in a variety of ways including, for example and without limitation, by filtering out and/or otherwise eliminating certain data fields, data types, data records, and/or data ranges and/or filtering data to include certain specified data fields, data types, data records, and/or data ranges.

Data Reformatting Operations—Data and/or associated fields may be formatted. For example and without limitation, data may be reformatted to different file formats and/or data fields may be reformatted to different formatting conventions (e.g., changing temperature data from Celsius to Fahrenheit, changing date fields from month-day-year format to day-month-year format, and/or the like).

Data Transformation Operations—Data may be transformed by applying one or more transformation operations to data. For example and without limitation, data may be transformed using proprietary, non-proprietary, and/or standardized algorithms and/or transformation operations.

Data Anonymization Operations—Certain data may comprise personally identifiable information and/or other sensitive information relating to individuals (e.g., health data). Such personally identifiable information and/or otherwise sensitive and/or personal information may be anonymized by, for example and without limitation, filtering out certain personal and/or sensitive data fields, adding noise to the data to generate anonymized data and/or associated data sets, and/or the like.

Derived Data Generation Operations—Data may be transformed and/or otherwise enhanced to generate derived data and/or associated data sets. In some embodiments, data may be combined and/or aggregated with other data and/or data sets to generate derived data. In further embodiments, one or more visualizations and/or other information may be generated based on data and/or associated data sets.

It will be appreciated that the above data processing activities, operations, and/or actions are to be viewed non-limiting examples, and that any data processing action, operation, and/or activity, and/or combinations thereof where data is transformed, enhanced, and/or otherwise changed may be used in connection with various embodiments. Moreover, certain types of data processing activities, operations, and/or actions may not necessarily transform data, but may enhance and/or add value to a dataset. For example, a data processing program may not necessarily transform data, but may validate and/or authenticate data received from a data provider and/or other previously processed data, resulting in validated and/or authenticated dataset (e.g., a dataset signed by a cryptographic key indicating that the data in the data set has been validated by the data processing service). In various instances herein, any activity, operation, and/or action performed by a data processing service 104a, 104b, and/or an associated program 106a, 106b, including any of the examples detailed above, may be referred to generally herein as a data processing operation.

Consistent with embodiments disclosed herein, a data consumer system 108 may wish to access and/or otherwise use data generated by the data provider 102 and/or processed by data processing services 104a, 104b. For example, as illustrated a data consumer system 108 may access processed data generated by data processing program 106b. The data consumer system 108 may use accessed data and/or associated data sets in a variety of contexts. For example, in some embodiments, the data consumer system 108 may use one or more visualization engines and/or dashboards to visualize, understand, and/or otherwise interact with accessed data.

In some embodiments, the data consumer system 108 may authenticate its rights to access data and/or associated datasets. For example, although not specifically illustrated in connection with FIG. 1, in some embodiments the data consumer system 108 may purchase and/or otherwise authenticate access to data via a data marketplace service and/or an associated system and/or service. As discussed in more detail below, in some embodiments, such a data marketplace service may be associated with and/or otherwise implemented by a trusted data management platform.

In certain instances, there may be several potential points of attack in the illustrated architecture 100 for a malicious party to intervene, steal, data, modify data, and/or engage in other nefarious activities. To mitigate the potential for such attacks, a variety of techniques may be employed to enhance the security of the architecture 100 and/or various entities and/or stakeholders. For example, in some embodiments, secure communication channels between the various entities may be established (e.g., such channels employing protocols such as Transport Layer Security ("TLS") and/or Secure Sockets Layer ("SSL")). In further embodiments, password and/or other credential-based authentication between the various entities and/or stakeholders may be used to establish security and/or trust. In yet further embodiments, non-password secure communication techniques may be applied. For example, endpoint secrets may be protected using white-box cryptographic methods and/or by employing trusted execution environments ("TEEs") and/or other secure processing environments and/or techniques. In some embodiments, to enable non-password administrative addressing to an endpoint, biometric authentication (e.g., authentication using Fast ID Online ("FIDO") protocol) may be used that may further protect endpoint secrets with whitebox cryptographic methods and/or TEEs and/or other secure processing environments.

Figure 2:
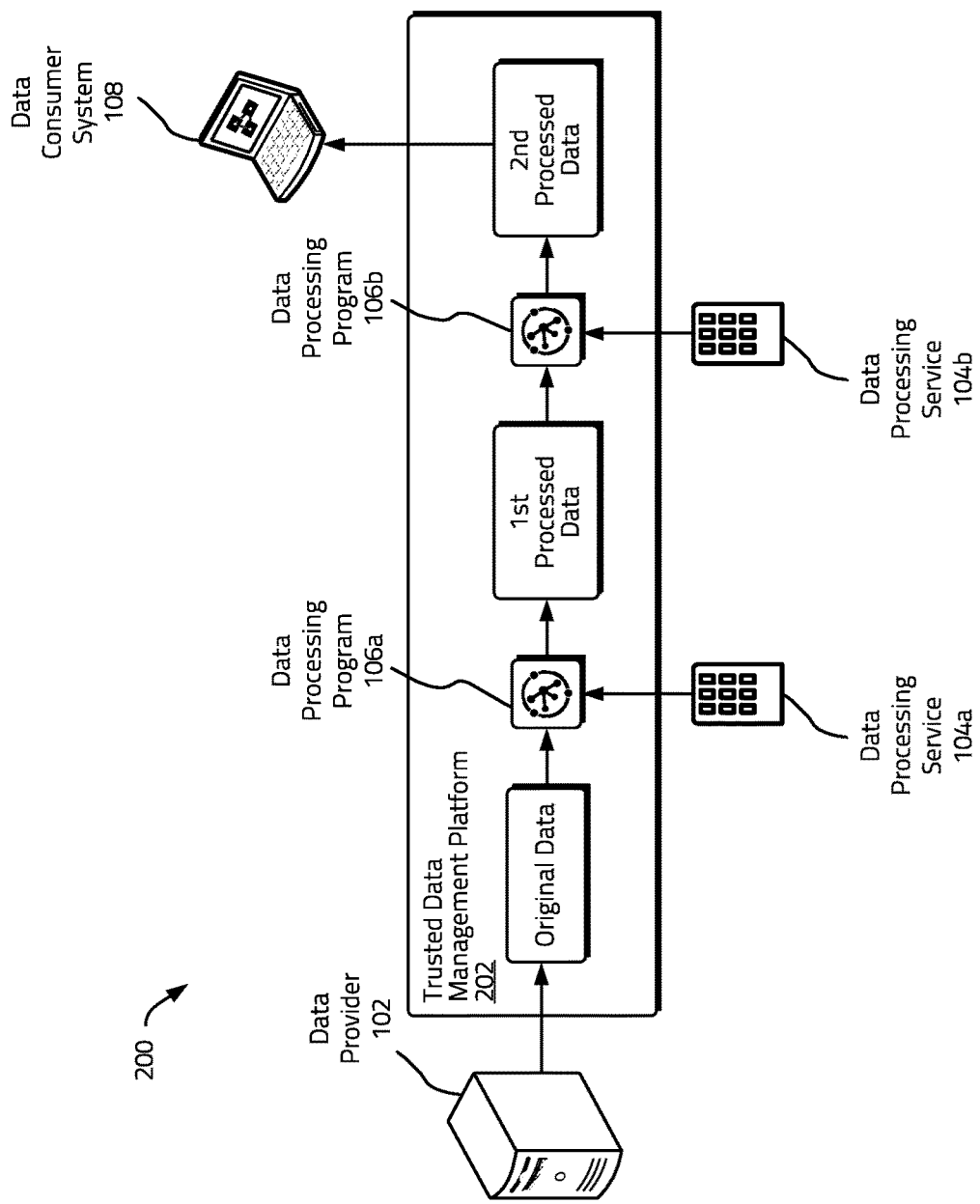
FIG. 2 illustrates an example of a data management architecture implementing a trusted data management platform consistent with various embodiments of the present disclosure.

Consistent with various embodiments disclosed herein, a trusted data management platform that in some embodiments may implement DRM techniques, may be used to protect data, associated processed data, and/or the interests of various data stakeholders. FIG. 2 illustrates an example of a data management architecture 200 implementing a trusted data management platform 202 consistent with various embodiments of the present disclosure.

In certain embodiments, a trusted data management platform 202 may implement and/or provide a trusted environment where data from one or more data providers 102 may be ingested, accessed, managed, processed, and/or distributed. In certain embodiments, the trusted data management platform 202 may implement various DRM techniques to protect associated data and/or processed data and/or manage the processing, use, access, and/or distribution of such data.

A data provider 102 may provide the trusted data management platform 202 with original data. In some embodiments, the data provider 102 may have a trusted relationship with the trusted data management platform 202 whereby the data provider 102 trusts that the trusted data management platform 202 will store, manage, process, use, and/or otherwise distribute the provided data in a particular manner and/or in accordance with one or more policies and/or requirements articulated by the data provider 102.

In some embodiments, the trusted data management platform 202 may provide a platform for one or more data processing programs 106a, 106b to operate on data and/or otherwise generate processed data and/or associated data sets. For example, a first data processing service 104a may provide the trusted data management platform 202 with a first data processing program 106a. The first data processing program 106a may execute within a protected and/or otherwise secure execution environment (e.g., a TEE) of the trusted data management platform 202 to process original data provided by the data provider 102 to the platform 202 and generate first processed data. In some embodiments, the execution of the first data processing program 106a may proceed in accordance with one or more policies and/or requirements articulated by one or more stakeholders (e.g., the data provider 102, the first data processing service 104a, a data consumer system 108, and/or the like) as enforced by the trusted data management platform 202.

Similarly, a second data processing service 104b may provide the trusted data management platform 202 with a second data processing program 106b. The second data processing program 106b may execute within the protected and/or otherwise secure execution environment of the trusted data management platform 202 to process the first processed data and generate second processed data. Like the first data processing program 106a, the second data processing program 106b may proceed in accordance with one or more policies and/or requirements articulated by one or more of the stakeholders (e.g., the data provider 102, the first data processing service 104a, the second data processing service 104b, the data consumer system 108, and/or the like) as enforced by the trusted data management platform 202.

In some embodiments, instead of executing within a protected and/or secure execution environment of the trusted data management platform 202, one or more of the data processing programs 106a, 106b may be executed locally by the associated data processing services 104a, 104b using data (e.g., original data and/or processed data) accessed from the trusted data management platform 202. For example, in some implementations, a data processing service 104a, 104b may retrieve data from the trusted data management platform 202 (e.g., after authenticating rights to access the data with the trusted data management platform 202), process the data locally using one or more associated data processing programs 106a, 106b, and provide resulting processed data to the trusted data management platform 202 for storage and/or management.

A data consumer system 108 may access various data, including processed data, from the trusted data management platform 202 and/or another associated system and/or service such as data marketplace service. In certain embodiments, prior to allowing access to data and/or processed data, a data consumer system 108 may be required to authenticate its rights to access and/or otherwise use the data and/or processed data with the trusted data management platform 202 and/or an associated service.

In some embodiments, the trusted data management platform 202 may comprise a data marketplace service that may allow a data consumer system 108 to interact with, purchase, and/or otherwise access data and/or processed data and/or subsets thereof managed by the trusted data management platform 202. In further embodiments, a data marketplace service separate from the trusted data management platform 202 may be used. In some embodiments, the trusted data management platform 202 may provide data and/or processed data to such a separate data marketplace for distribution to authenticated data consuming systems. In further embodiments, a separate data marketplace service may function as an intermediary facilitating data transactions between a data consumer system 108 and one or more trusted data management platforms 202.

Figure 3:
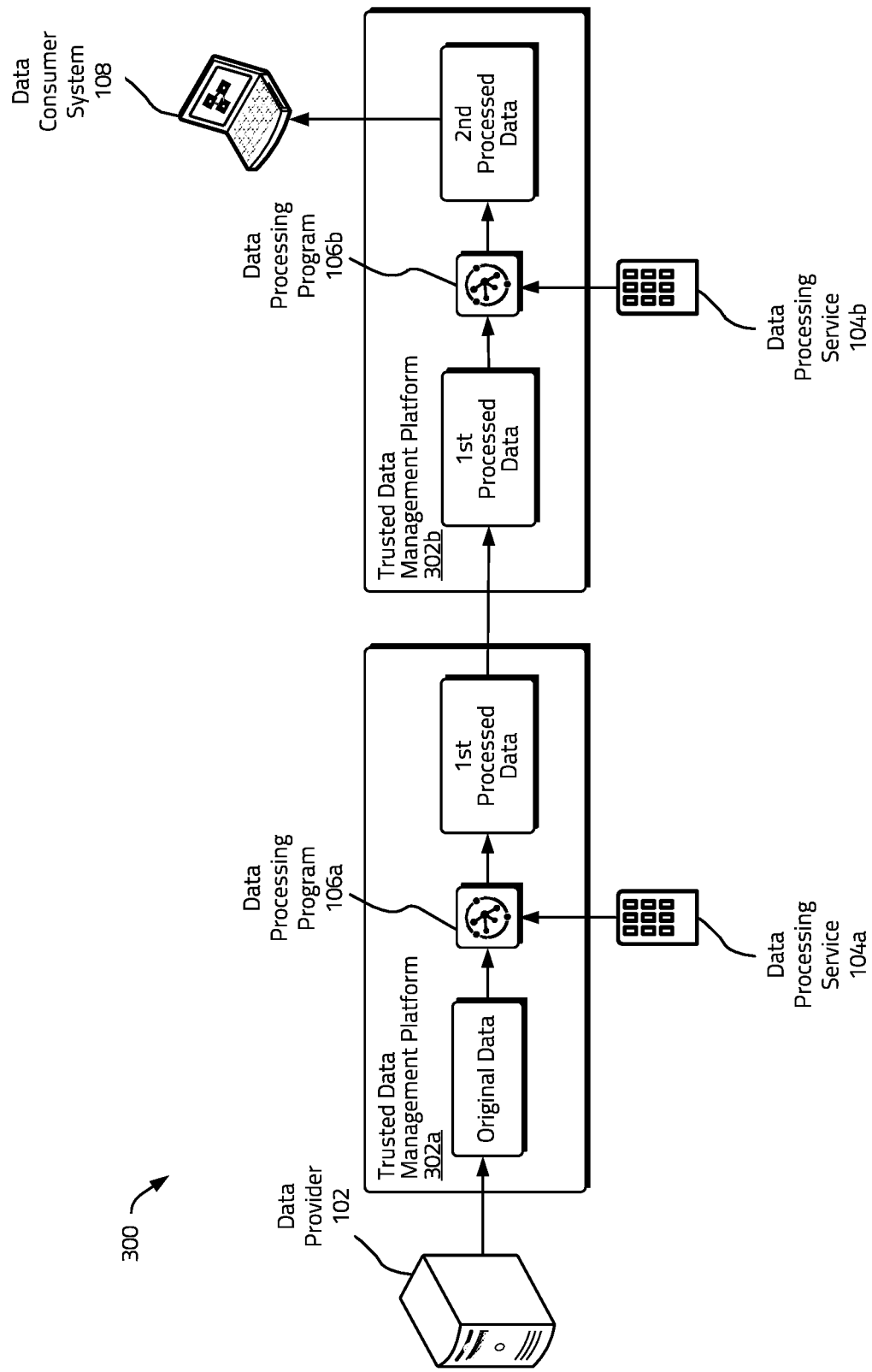
FIG. 3 illustrates an example of a data management architecture implementing a plurality of trusted data management platforms consistent with various embodiments of the present disclosure.

Although the example data management architecture 200 illustrated in connection with FIG. 2 includes a single trusted data management platform, it will be appreciated that a plurality of data management platforms may be included in further implementations consistent with various embodiments disclosed herein. FIG. 3 illustrates an example of a data management architecture 300 implementing a plurality of trusted data management platforms 302a, 302b consistent with various embodiments of the present disclosure.

As shown in FIG. 3, a first trusted data management platform 302a may receive data from a data provider 102. The first trusted data management platform 302a may further process the original data received from the data provider 102 using a first data processing program 106a provided to the first trusted data management platform 302a by a first data processing service 104a to generate first processed data. The first processed data may be securely shared by the first trusted data management platform 302a with a second trusted data management platform 302b (e.g., shared via a secure communication channel). The second trusted data management platform 302b may further process the first processed data received from the first trusted data management platform 302a using a second data processing program 106b to generate second processed data. The data consumer system 108 may access the second processed data from the second trusted data management platform 302b and/or a data marketplace service associated with the second trusted data management platform 302b. In this manner, a plurality of trusted data management platforms 302a, 302b may be used to protect, manage, and/or process data in the illustrated data management architecture 300.

Certain conventional data management ecosystems may be associated with certain issues from the perspective of a data consumer. For example, a data consumer may not be certain what parties, services, and/or entities previously processed the data they access and/or how such data was processed. A data consumer may in certain circumstances, for example, only be able to obtain information from a platform in which they are directly interacting and not be able to obtain information regarding data processing by other parties earlier in the data chain-of-custody. Moreover, a data consumer may not necessarily be certain which parties processed an earlier version of a dataset, which may be especially true when an earlier dataset was generated by a data platform with which the data consumer did not directly interact. Finally, a data consumer may not be certain as to what party originally generated a dataset, which again may be especially true when the original data provider did not directly interact with the data consumer.

Figure 4:
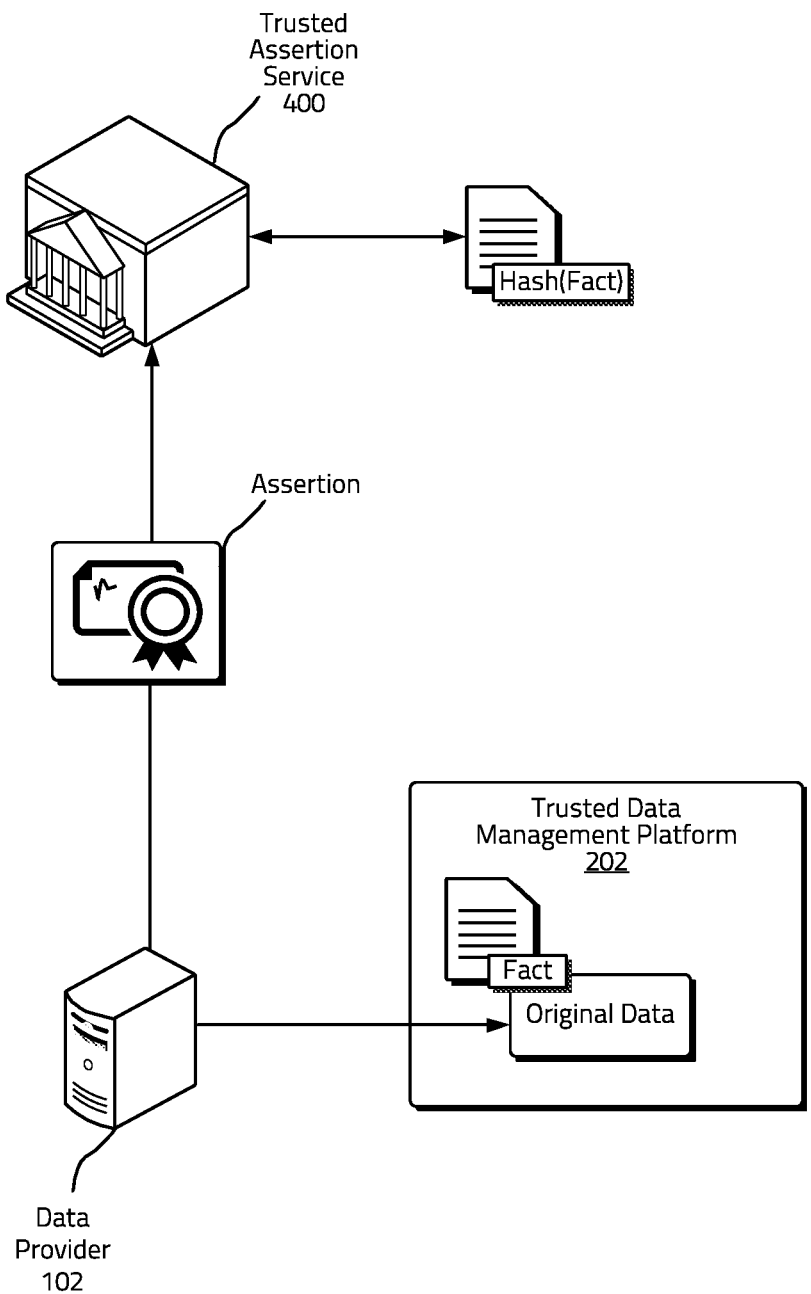
FIG. 4 illustrates an example of recording assertions and/or other fact information associated with data with a trusted assertion service consistent with various embodiments of the present disclosure.

Embodiments of the disclosed systems and methods may help ameliorate some and/or all of these issues through a trusted mechanism for securely recording trusted assertions and/or other fact information associated with data in a data management architecture. FIG. 4 illustrates an example of recording assertions and/or other fact information associated with data with a trusted assertion service 400 consistent with various embodiments of the present disclosure. Specifically, FIG. 4 illustrates recording of assertion and/or other fact information associated with data provided to a trusted data management platform 202 by a data provider 102.

When a data provider 102 generates data (e.g., original data) and/or processes data, it may also generate certain information associated with the data that, in certain instances herein, may be referred to as fact information and/or a "fact" associated with the data. Fact information may comprise a variety of information relating to the associated data and/or its provenance. For example and without limitation, fact information associated with original data provided to the trusted data management platform 202 by the data provider 102 may comprise one or more of a ID of the data provider 102, a time stamp associated with the data (e.g., a time stamp associated with the generation of the data by the data provider 102 and/or another data service, the ingestion of the data into the trusted data management platform 202, and/or the like), a hash of the associated data and/or a portion thereof, an indication of a function used to generate the hash, an indication of any portion of data used to generate the hash and/or other information relating to the generation of the hash, a geolocation associated with the data provider 102 and/or the generation of the data, configuration and/or condition information relating to the data (e.g., configuration information regarding how the data was generated, collected, formatted, and/or the like), and/or description and/or other information associated with the data (e.g., metadata such as data type and/or the like).

The fact information and/or associated data may be communicated to the trusted data management platform 202 by the data provider 102. In some embodiments, the fact information may be communicated to the trusted data management platform 202 separately from the associated data. In further embodiments, the fact information may be communicated to the trusted data management platform 202 in a package that also includes the associated data. The trusted data management platform 202 may store the fact information together with the associated data and/or in a separate database used to manage fact information associated with data managed by the trusted data management platform 202.

Consistent with various embodiments disclosed herein, the data provider 102 may communicate an assertion relating to the data provided to the trusted data management platform 202 to a trusted assertion service 400. In certain embodiments, the assertion may comprise the fact information associated with the data and/or the hash of the fact information and/or a portion thereof. The assertion may further be signed with a key associated with the data provider 102.

Upon receipt of the assertion, the trusted assertion service 400 may verify the signature associated with the assertion to determine whether the data provider 102 is a legitimate and/or otherwise trusted entity. For example, in certain embodiments, the trusted assertion service 400 may determine that an authority associated with a key used to generate the signature by the data provider 102 is current and/or otherwise has not been revoked. In some embodiments, the trusted assertion service 400 may interact with a separate authentication service to authenticate the signature of the data provider 102 associated with the assertion.

If the trusted assertion service 400 successfully verifies the signature in the assertion (e.g., confirming that the data provider 102 is a legitimate and/or otherwise trusted entity), the fact information and/or the hash of the fact information and/or a portion thereof may be recorded by the trusted assertion service 400. The trusted assertion service 400 may store the fact information and/or the hash of the fact information and/or a portion thereof in a database and/or ledger. In some embodiments, the fact information and/or hash of the fact information may be securely recorded in a trusted immutable assertion ledger that, in some implementations, may comprise a trusted immutable distributed assertion ledger ("TIDAL"). In various embodiments, a ledger used to record the fact information and/or hash of the fact information may implement ledger processes that may be resistant to byzantine failures, entries that may be immutable and/or relatively immutable, entries that may be time-synced (at least in part), entries that may be scalable, and/or entries that may be available for relatively fast lookup. In certain embodiments, assertion ledgers, including TIDALS, may employ various blockchain technologies.

Fact information and/or hashes of fact information and/or portions thereof recorded by the trusted assertion service 400 in the associated database and/or ledger may be used in connection with verifying the integrity, provenance, and/or chain-of-handling of data. For example, as discussed in more detail below, a data consumer system may query the trusted assertion service 400 to identify whether certain information is included the database and/or ledger, providing a trusted mechanism for the data consumer system to verify the integrity, provenance, and/or chain-of-handling of data.

In certain embodiments, data provided to and/or otherwise accessed by the trusted data management platform 202 from the data provider 102 may be supplemented by the trusted data management platform 202 and/or one or more data processing programs associated with and/or executing on the platform 202 (e.g., programs executing within a secure and/or protected environment of the platform 202). For example, in some embodiments, timestamp and/or unique data ID information may be added to data provided to and/or otherwise accessed by the trusted data management platform 202 that may allow a data consumer to use these supplemental values and/or information when querying data (e.g., querying data using the unique data ID information). In some embodiments, such information may be added by the data provider 102 itself, the trusted data management platform 202, and/or one or more data processing services and/or associated data processing programs.

Figure 5:
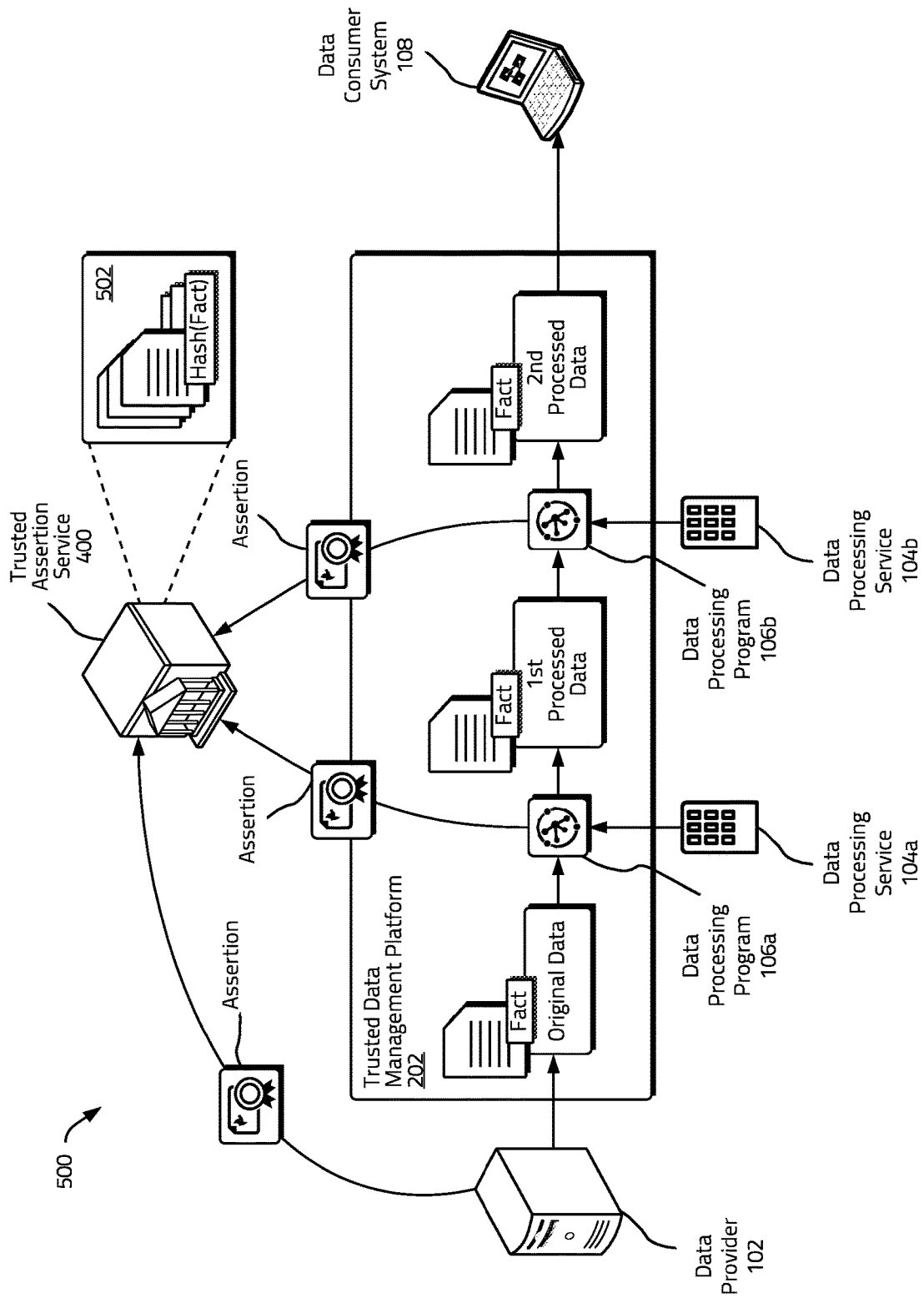
FIG. 5 illustrates an example of a data management architecture for recording assertions associated with data and/or processed data with a trusted assertion service consistent with various embodiments of the present disclosure.

Assertions relating to the generation and/or processing of data may be recorded with a trusted assertion service 400 at a variety of stages during the chain-of-handling of the data. For example, FIG. 5 illustrates an example of a data management architecture 500 for recording assertions associated with data and/or processed data with a trusted assertion service 400 consistent with various embodiments of the present disclosure.

Data generated by a data provider 102 may be communicated to a trusted data management platform 202 for storage and/or management by the platform 202. As discussed above, the data provider 102 may also generate fact information associated with the data that may comprise, for example and without limitation, one or more of a ID of the data provider 102, a time stamp associated with the data (e.g., the generation of the data), a hash of the associated data and/or a portion thereof, an indication of a function used to generate the hash, an indication of any portion of data used to generate the hash and/or other information relating to the generation of the hash, a geolocation associated with the data provider 102 and/or the generation of the data, condition information associated with the data, and/or description and/or other information associated with the data (e.g., metadata). The data provider 102 may communicate such fact information to the trusted data management platform 202 together with and/or separate from the associated data for storage. In further embodiments, instead of fact information being generated by the data provider 102, the fact information and/or aspects thereof may be generated by the trusted data management platform 202 upon receipt of the data from the data provider 102.

In various disclosed embodiments, the data provider 102 may communicate an assertion to a trusted assertion service 400 relating to the data provided to trusted data management platform 202. The assertion may comprise, for example and without limitation, one or more of the fact information associated with the data, a hash of the fact information and/or a portion thereof, and/or a digital signature. In some embodiments, the digital signature may comprise a signature over the assertion and/or a part of the assertion with a key associated with the data provider 102. In this manner, the signature may securely associate the assertion and/or its constituent information with the data provider 102.

Upon receipt of the assertion, the trusted assertion service 400 may verify and/or otherwise authenticate the signature associated with the assertion to determine whether the data provider 102 is a legitimate and/or otherwise trusted entity. If the trusted assertion service 400 successfully verifies the signature, thereby confirming that the data provider 102 is a legitimate and/or otherwise trusted entity, the fact information and/or the hash of the fact information and/or a portion thereof included in the assertion may be recorded by the trusted assertion service 400. As discussed above, the trusted assertion service 400 may store the fact information and/or the hash of the fact information and/or a portion thereof in a database and/or ledger that may comprise a trusted immutable assertion ledger 502.

Although the embodiments shown in FIG. 5 illustrate the assertion being generated by the data provider 102 and communicated directly from the data provider 102 to the trusted assertion service 400, it will be appreciated that other implementations are also possible. For example, in some embodiments, the assertion and/or its constituent information (e.g., fact information and/or a hash of the fact information and/or a portion thereof) may be generated by the data provider 102 and communicated to the trusted data management platform 202. The trusted data management platform 202 may communicate the assertion and/or constituent information to the trusted assertion service 400 for secure recordation (e.g., after verifying a signature by the data provider 102 over the assertion and/or a part of the assertion and/or the like). In yet further embodiments, the trusted data management platform 202 may generate the assertion and/or its constituent information (e.g., fact information and/or a hash of the fact information and/or a portion thereof) rather than the data provider 102 itself.

In further embodiments, instead of or in addition to being signed by a key securely associated with the data provider 102, an assertion and/or its constituent information may be signed using a secure key associated with the trusted data management platform 202 before being communicated to the trusted assertion service 400 for secure recordation. Upon receipt of the signed assertion from the trusted data management platform 202, the trusted assertion service 400 may verify and/or otherwise authenticate one or more signatures associated with the assertion to determine whether the assertion has been signed by a legitimate and/or otherwise trusted entity.

For example, in some embodiments, as discussed above, the trusted assertion service 400 may verify and/or otherwise authenticate a signature by the data provider 102 to determine whether the data provider 102 is a legitimate and/or otherwise trusted entity. In addition to or in lieu of verifying a signature on a received assertion by the data provider 102, the trusted assertion service 400 may verify a signature by the trusted data management platform 202 on a received assertion.

In some embodiments, the trusted assertion service 400 may rely on any assertion received from and signed by the trusted data management platform 202 as being trusted. Accordingly, the trusted assertion service 400 may perform authentication check on the signature on the assertion by the trusted data management platform 202 but not necessarily a signature on the assertion by the data provider 102. In further embodiments, signatures on the assertion from both the from the data management platform 200 and the data provider 102 may be authenticated. Although not specifically illustrated, the trusted assertion service 400 may interact with a separate authentication service in connection with authenticating various signatures on assertions (e.g., signatures by the data provider 102, the trusted data management platform 202, and/or one or more data processing services 104*a*, 104*b*, as described in more detail below).

If the trusted assertion service 400 successfully verifies that the signatures from the data provider and/or the trusted data management platform 202 are legitimate, the fact information and/or hash of the fact information and/or portion thereof may be recorded by the trusted assertion service 400 in a database and/or ledger 502. In certain embodiments, the recorded fact information and/or hash of the fact information and/or portion thereof may be recorded as a timestamped entry in the database and/or ledger 502.

In certain embodiments, one or more data processing services 104*a*, 104*b* may be interested in processing the data provided to the trusted data management platform 202 and/or data derived therefrom to generate processed data and/or associated data sets. For example, as illustrated, a first data processing service 104*a* may use a first data processing program 106*a* to process the original data received by the trusted data management platform 202 by the data provider 102 and generate corresponding first processed data.

In some embodiments, the first data processing service 104*a* may transmit the first data processing program 106*a* to the trusted data management platform 202 to operate on data within a protected and/or secure execution environment of the trusted data management platform 202. In certain embodiments, the first data processing service 104*a* may not necessarily communicate the first data processing program 106*a* to the trusted data management platform 202, but may select the first data processing program 106*a* to operate on data using standard data transformation and/or processing libraries and/or the like offered by the trusted data management platform 202 and/or an associated service and/or coordinate the provisioning of the first data processing program 106*a* to the trusted data management platform 202 via one or more other services. In further embodiments, instead of executing with a protected and/or secure execution environment of the trusted data management platform 202, the first data processing program 106*a* may be executed locally by the first data processing service 104*a* using data accessed from the trusted data management platform 202.

When the first data processing program 106*a* processes the data received from the data provider 102 to generate the first processed data, fact information may also be generated. In some embodiments, the first data processing program 106*a* may generate the fact information. In further embodiments, the protected and/or secure execution environment of the trusted data management platform 202 may be used to generate the fact information when the first data processing program is executed to operate on data within the protected and/or secure execution environment. In yet further embodiments, the fact information may be generated by the first data processing service 104*a*, which may execute the first data processing program 106*a* locally and/or call the trusted data management platform 202 to execute the first data processing program 106*a* as described above.

Fact information associated with the first processed data may include, for example and without limitation, one or more of:
  ID information associated with the first data processing service 104*a*.
  ID information associated with the first data processing program 106*a*.
  A hash of the original data operated on by the first data processing program 106*a* and/or a portion thereof.

A hash of the first processed data generated by the first data processing program 106*a* and/or a portion thereof.

A hash of the first data processing program 106*a* and/or a portion thereof.

Hash generation information that may indicate, for example and without limitation, one or more hash functions used to generate the hash of the original data and/or the portion of the original data, the hash of the first processed data and/or the portion of the first processed data, and/or the hash of the first data processing program and/or the portion of the first data processing program. The hash generation information may further comprise an indication of any portion of data and/or program used to generate the hashes and/or other information relating to the generation of the hashes. In some embodiments, the hash generation information may further comprise an indication of a hash function and/or associated parameters used to generate hashed fact information recorded by the trusted assertion service 400.

Timestamp information associated with the original data and/or the first processed data (e.g., a time stamp associated with the generation of the original data and/or uploading of the original data to the trusted data management platform 202 and/or the generation of the first processed data by the first data processing program 106*a*).

Configuration and/or condition information relating to the generation of the first processed data by the first data processing program 106*a*.

Description information relating to what changes and/or processes were performed on the original data by the first data processing program 106*a* in connection with generating the first processed data.

The trusted data management platform 202 may store the fact information with the associated first processed data and/or in a separate database used to manage fact information.

Consistent with various embodiments, an assertion relating to the first processed data may be generated and/or communicated to the trusted assertion service 400 by the trusted data management platform 202 and/or the first data processing service 104*a*. In certain embodiments, the assertion may comprise the fact information associated with the first processed data and/or a hash of the fact information and/or a portion thereof. In some embodiments, the assertion may be communicated to the trusted assertion service 400 by the first data processing service 104*a*. In further embodiments, the assertion may be communicated to the trusted assertion service 400 by the trusted data management platform 202.

The assertion may comprise one or more signatures. For example, in some embodiments, the assertion may be signed with a key associated with the first data processing service 104*a*, the first data processing program 106*a*, and/or the trusted data management platform 202. In this manner, the assertion may be securely associated with the first data processing service 104*a*, the first data processing program 106*a*, and/or the trusted data management platform 202.

Upon receipt of the signed assertion, the trusted assertion service 400 may verify and/or otherwise authenticate one or more signatures associated with the assertion to determine whether the assertion has been signed by a legitimate and/or otherwise trusted entity. For example, in some embodiments, the trusted assertion service 400 may verify and/or otherwise authenticate a signature on the assertion by the first data processing service 104*a*, the first data processing program 106*a*, and/or the trusted data management platform 202 to determine whether they are legitimate and/or otherwise trusted entities. In certain embodiments, a private key associated with the first data processing program 106*a* used to sign an assertion may be protected by access control mechanisms implemented by the trusted data management platform 202. In further embodiments, the private key associated with the first data processing program 106*a* may be protected using key protection technologies such as whitebox cryptographic protection methods (e.g., protections implemented by the associated data processing service 104*a*), which may protect the private key from being accessed in the clear by the trusted data management platform 202.

In some embodiments, the trusted assertion service 400 may rely on the trusted data management platform 202 to perform certain authentication and/or trust determinations regarding the first data processing service 104*a* and/or the associated first data processing program 106*a*. Accordingly, the trusted assertion service 400 may rely on any assertion received from and signed by the trusted data management platform 202 as being trusted without necessarily verifying signatures on an assertion by the first data processing service 104*a* and/or the associated first data processing program 106*a*. In further embodiments, multiple signatures on the assertion may be verified by the trusted assertion service 400 (e.g., signatures by the first data processing service 104*a*, the first data processing program 106*a*, and/or the trusted data management platform 202).

If the trusted assertion service 400 successfully verifies and/or authenticates one or more signatures associated with the assertion, the fact information and/or hash of the fact information and/or portion thereof included in the assertion may be recorded by the trusted assertion service 400 in a database and/or ledger 502. In various embodiments, the recorded fact information and/or hash of the fact information and/or portion thereof may be recorded as a timestamped entry in the database and/or ledger 502.

As described above, in certain embodiments, data provided to and/or otherwise accessed by the trusted data management platform 202 from the data provider 102 may be supplemented by the trusted data management platform 202 and/or one or more data processing programs 106*a*, 106*b* associated with and/or executing on the platform 202 (e.g., programs executing within a secure and/or protected environment of the platform 202). For example, in some embodiments, timestamp and/or unique data ID information may be added to data provided to and/or otherwise accessed by the trusted data management platform 202 and/or programs 106*a*, 106*b* that may allow a data consumer system 108 to use these supplemental values and/or information when querying data (e.g., querying data using the unique data ID information). In some embodiments, such information may be added by the data provider 102 itself, the trusted data management platform 202, and/or one or more data processing services 104*a*, 104*b* and/or associated data processing programs 106*a*, 106*b*. For example, supplemental information including unique data ID information and/or timestamp information may be added by the first processing program 106*a* and be included in the first processed data.

When the first data processing program 106*a* processes the data received from the data provider 102 to generate the first processed data, fact information may also be generated. In some embodiments, the first data processing program 106*a* may generate the fact information. In further embodiments, the protected and/or secure execution environment of the trusted data management platform 202 may be used to generate the fact information when the first data processing program is executed to operate on data within the protected and/or secure execution environment. In yet further embodiments, the fact information may be generated by the first data processing service 104a, which may execute the first data processing program 106a locally and/or call the trusted data management platform 202 to execute the first data processing program 106a as described above.

As illustrated in FIG. 5, a second data processing service 104b may further use a second data processing program 106b to process the first processed data to generate second processed data. In some embodiments, the second data processing service 104b may transmit the second data processing program 106b to the trusted data management platform 202 to operate on data within the protected and/or secure execution environment of the trusted data management platform 202. In certain embodiments, the second data processing service 104b may not necessarily communicate the second data processing program 106b to the trusted data management platform 202, but may select the second data processing program 106b to operate on data using standard data transformation and/or processing program libraries and/or the like offered by the trusted data management platform 202 and/or an associated service and/or coordinate the provisioning of the second data processing program 106b to the trusted data management platform 202 via one or more other services. In further embodiments, instead of executing with a protected and/or secure execution environment of the trusted data management platform 202, the second data processing program 106b may be executed locally by the second data processing service 104b using data accessed from the trusted data management platform 202.

When the second data processing program 106b processes the first processed data to generate the second processed data, associated fact information may also be generated. In some embodiments, the second data processing program 106b may generate the fact information. In further embodiments, the protected and/or secure execution environment of the trusted data management platform 202 may be used to generate the fact information when the second data processing program 106b is executed to operate on data within the protected and/or secure execution environment. In yet further embodiments, the fact information may be generated by the second data processing service 104b, which may execute the second data processing program 106b locally and/or by calling the trusted data management platform 202 to execute the second data processing program 106b as described above.

Fact information associated with the second processed data may include, for example and without limitation, one or more of:
- ID information associated with the second data processing service 104b.
- ID information associated with the second data processing program 106b.
- A hash of the first processed data operated on by the second data processing program 106b and/or a portion thereof.
- A hash of the second processed data generated by the second data processing program 106b and/or a portion thereof.
- A hash of the second data processing program 106b and/or a portion thereof.
- Hash generation information that may indicate, for example and without limitation, one or more hash functions used to generate the hash of the first processed data and/or the portion of the first processed data, the hash of the second processed data and/or the portion of the second processed data, and/or the hash of the second data processing program and/or the portion of the second data processing program. The hash generation information may further comprise an indication of any portion of data and/or program used to generate the hashes and/or other information relating to the generation of the hashes. In some embodiments, the hash generation information may further comprise an indication of a hash function and/or associated parameters used to generate hashed fact information recorded by the trusted assertion service 400.
- Timestamp information associated with the first processed data and/or the second processed data (e.g., a time stamp associated with the generation of the first processed data and/or the generation of the second processed data by the second data processing program 106b).
- Configuration and/or condition information relating to the generation of the second processed data by the second data processing program 106b.
- Description information relating to what changes and/or processes were performed on the first processed data by the second data processing program 106b in connection with generating the second processed data.

The trusted data management platform 202 may store the fact information with the associated second processed data and/or in a separate database used to manage fact information.

Consistent with various embodiments disclosed herein, an assertion relating to the second processed data may be generated and/or communicated to the trusted assertion service 400 by the trusted data management platform 202 and/or the second data processing service 104b. In certain embodiments, the assertion may comprise the fact information associated with the second processed data and/or a hash of the fact information and/or a portion thereof. In some embodiments, the assertion may be communicated to the trusted assertion service 400 by the second data processing service 104b. In further embodiments, the assertion may be communicated to the trusted assertion service 400 by the trusted data management platform 202.

The assertion may comprise one or more signatures. For example, in some embodiments, the assertion may be signed with a key associated with the second data processing service 104b, the second data processing program 106b, and/or the trusted data management platform 202. In this manner, the assertion may be securely associated with the second data processing service 104b, the second data processing program 106b, and/or the trusted data management platform 202.

Upon receipt of the signed assertion, the trusted assertion service 400 may verify and/or otherwise authenticate one or more signatures associated with the assertion to determine whether the assertion has been signed by a legitimate and/or otherwise trusted entity. For example, in some embodiments, the trusted assertion service 400 may verify and/or otherwise authenticate a signature on the assertion by the second data processing service 104b, the second data processing program 106b, and/or the trusted data management platform 202 to determine whether they are legitimate and/or otherwise trusted entities. In certain embodiments, a private key associated with the second data processing program 106b used to sign an assertion may be protected by access control mechanisms implemented by the trusted data management platform 202. In further embodiments, the private key associated with the second data processing program 106*b* may be protected using key protection technologies such as whitebox cryptographic protection methods (e.g., protections implemented by the associated data processing service 104*b*), which may protect the private key from being accessed in the clear by the trusted data management platform 202.

In some embodiments, the trusted assertion service 400 may rely on the trusted data management platform 202 to perform certain authentication and/or trust determinations regarding the second data processing service 104*b* and/or the associated second data processing program 106*b*. Accordingly, the trusted assertion service 400 may rely on any assertion received from and signed by the trusted data management platform 202 as being trusted without necessarily verifying signatures on an assertion by the second data processing service 104*b* and/or the associated second data processing program 106*b*. In further embodiments, multiple signatures on the assertion may be verified by the trusted assertion service 400 (e.g., signatures by the second data processing service 104*b*, the second data processing program 106*b*, and/or the trusted data management platform 202).

If the trusted assertion service 400 successfully verifies and/or authenticates one or more signatures associated with the assertion, the fact information and/or hash of the fact information and/or portion thereof included in the assertion may be recorded by the trusted assertion service 400 in a database and/or ledger 502. In various embodiments, the recorded fact information and/or hash of the fact information and/or portion thereof may be recorded as a timestamped entry in the database and/or ledger 502.

Fact information and/or hashes of fact information and/or portions thereof recorded by the trusted assertion service 400 in the associated database and/or ledger 502 may be used in connection with verifying the integrity, provenance, and/or chain-of-handling of data. For example, as illustrated and described below in connection with FIG. 6, a data consumer system 108 may query the trusted assertion service 400 to identify whether certain information is included the database and/or ledger entries, thereby providing a trusted mechanism for the data consumer system 108 to verify the integrity, provenance, and/or chain-of-handling of data it receives and/or otherwise accesses from the trusted data management platform 202.

Although various illustrated examples show use of a single trusted assertion service 400, it will be appreciated that any suitable number of trusted assertion services may be employed. For example and without limitation, a first trusted assertion service may record fact information and/or hashes of fact information and/or portions thereof relating to original data ingested into the trusted data management platform 202 (e.g., original data provided by data provider 102), a second trusted assertion service (or multiple assertion services) may record fact information and/or hashes of fact information and/or portions thereof relating to processed data (e.g., first processed data generated by the first data processing service 104*a* and/or the first data processing program 106*b*, second processed data generated by the second data processing service 104*b* and/or the first data processing program 106*b*, and/or the like). Therefore, it will be appreciated that various aspects of the illustrated ecosystems and/or architectures include herein are to be considered as nonlimiting examples of possible implementations.

In some embodiments, the trusted data management platform 202 may manage the governance of one or more distributed databases and/or associated datasets that may not be directly within and/or controlled by the platform 202. For example, the trusted data management platform 202 may manage data associated with one or more distributed databases and/or datasets via one or more suitably configured application programming interfaces ("APIs").

Figure 6:
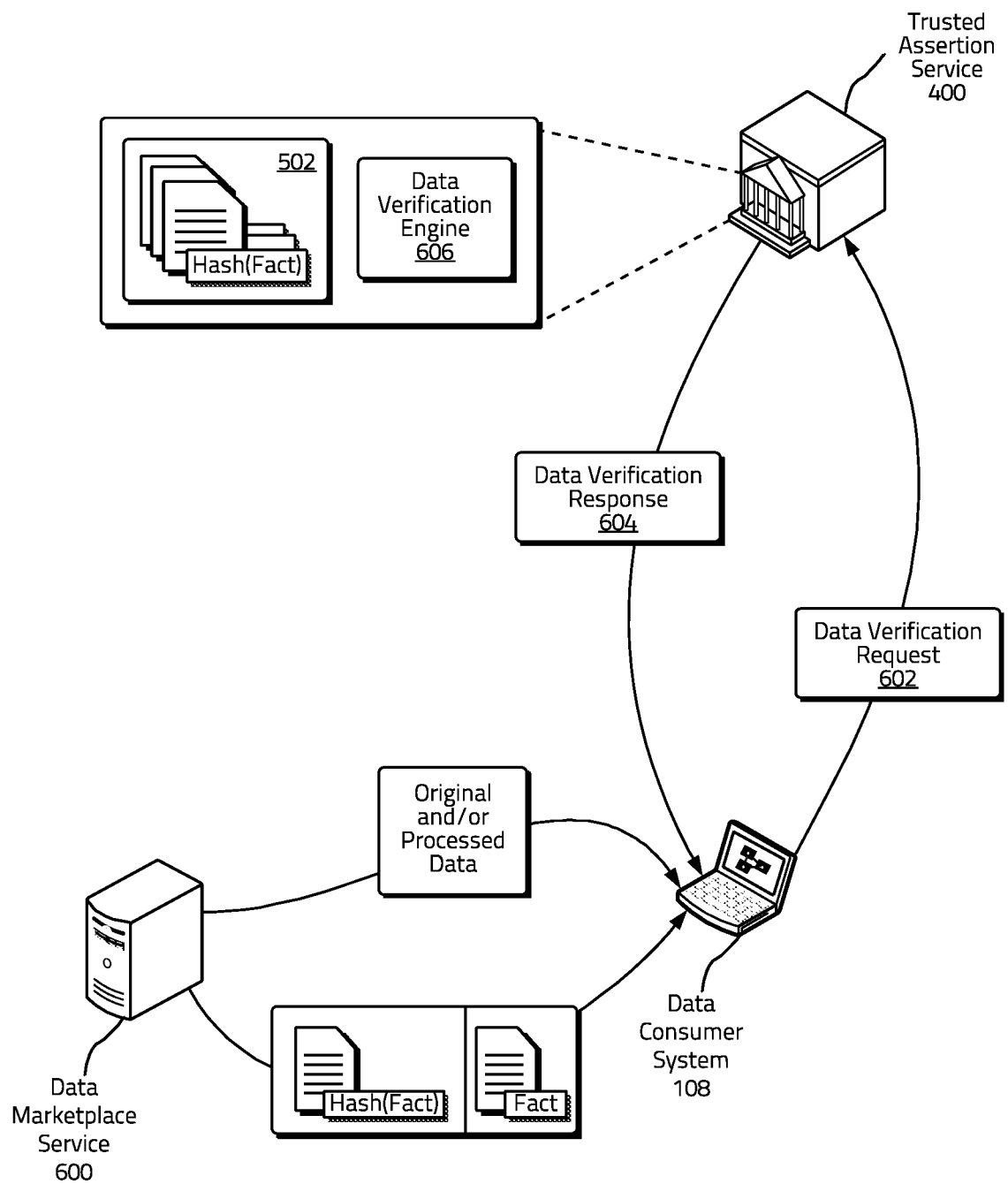
FIG. 6 illustrates an example of a data verification process consistent with various embodiments of the present disclosure.

FIG. 6 illustrates an example of a data verification process consistent with various embodiments of the present disclosure. As discussed above, fact information and/or hashes of fact information and/or portions thereof may be recorded by a trusted assertion service 400 in the associated database and/or ledger 502. Recorded information in the database and/or ledger 502 may be used in connection with verifying the integrity, provenance, and/or chain-of-handling of data.

A data consumer system 108 may access original and/or processed data from a data marketplace service 600. In some embodiments, the data marketplace service 600 may comprise a service implemented by a trusted data management platform, and therefore may be executed by a same system and/or service of the trusted data management platform. In some embodiments, the data marketplace service 600 may be a separate and/or otherwise independent service from a trusted data management platform configured to provide a marketplace dashboard for data consumers to access data managed by a trusted data management platform. Although in the illustrated embodiments the data marketplace service 600 may provide the data consumer system 108 with the original and/or processed data, it will be appreciated that in further embodiments, the data marketplace service 600 may operate as an intermediary in a data transaction between a data consumer system 108 and a trusted data management platform whereby data access is provided directly by the trusted data management platform.

The data consumer system 108 may further receive fact information and/or a hash of fact information and/or a portion thereof associated with the accessed data. In some embodiments, the fact information and/or a hash of fact information and/or a portion thereof may be received together with the associated data. In further embodiments, the fact information and/or a hash of fact information and/or a portion thereof may be received separate from the associated data. In certain embodiments, the fact information may comprise the hash generation information (e.g., an indication of a hash function and/or associated parameters such as hash data ranges and/or the like used to generated hashed information used in connection with validating and/or authenticating fact information as described below).

In certain embodiments, the data consumer system 108 may receive the fact information and/or a hash of fact information and/or a portion thereof from the trusted data management platform and/or a data marketplace service 600 implemented by the trusted data management platform. In further embodiments, the data consumer system 108 may receive the fact information and/or a hash of fact information and/or a portion thereof from a data marketplace service 600 separate from a trusted data management platform.

The data consumer system 108 may wish to verify fact information associated with the information it accesses from the data marketplace service 600 and/or an associated trusted data management platform. For example, the data consumer system 108 may receive processed data and associated fact information and may wish to verify the accuracy of the fact information associated with the received processed data and/or learn more about the provenance and/or chain-of-handling of the processed data.

To verify fact information associated with processed data, the data consumer system 108 may issue a data verification request 602 to a trusted assertion service 400. In some embodiments, the data verification request 602 may comprise the fact information and/or a hash of the fact information and/or a portion thereof. In some embodiments, the hash may be generated based on hash generation information included in the fact information. Upon receipt of the data verification request 602, the trusted assertion service 400 and/or a data verification engine 606 executing on the service may query a database and/or ledger 502 managed by the trusted assertion service 400 to determine whether the fact information and/or the hash of the fact information and/or the portion thereof is included in the database and/or ledger 502 managed by the trusted assertion service 400.

If the fact information and/or the hash of the fact information and/or the portion thereof is included in the database and/or ledger 502 maintained by the trusted assertion service 400, the trusted assertion service 400 and/or the associated data verification engine 606 may return a data verification response 604 to the data consumer system 108 indicating that the fact information associated with the data verification request 602 is authenticated and/or otherwise verified. If the fact information and/or the hash of the fact information and/or the portion thereof is not included in the database and/or ledger 502 maintained by the trusted assertion service 400, the trusted assertion service 400 and/or the associated data verification engine 606 may return a data verification response 604 to the data consumer system 108 indicating that the fact information associated with the data verification request 602 was not verified. Based on the received data verification response 604, the data consumer system 108 may determine whether information asserted about data accessed by the system 108 reflected in associated fact information may be trusted.

In certain embodiments, a data consumer system 108 may receive fact information and/or a hash of fact information and/or a portion thereof associated with the data it receives from the data marketplace service 600 as well as fact information and/or hashes of fact information and/or portions thereof associated with datasets earlier in the chain-of-handling of the data received from the data marketplace service 600. For example, the data consumer system 108 may receive fact information and/or a hash of the fact information and/or a portion thereof associated with processed data it receives from the data marketplace service 600, as well as fact information and/or a hash of the fact information and/or a portion thereof associated with original data provided by a data provider that was used to generate the processed data received by the data consumer system 108 and/or earlier processed versions of the data. In certain embodiments, using this chain-of-handling fact information, the data consumer system 108 may ascertain, for example and without limitation, one of more of how data was originally generated, by which parties it was generated, when it was generated, which parties and/or programs operated on and/or otherwise processed the data, and/or the like. In some embodiments, this may be done without necessarily exposing the earlier datasets (e.g., the original data and/or earlier processed versions of the data) to the data consumer system 108. The data consumer system 108 may verify this fact information relating to earlier versions of the data with the trusted assertion service 400.

In some embodiments, chained hash information included in fact information associated with a received dataset may be used to identify fact information associated with earlier datasets used in connection with generating the data received by the data consumer system 108. For example, in a data chain-of-handling whereby original data is processed by two data processing programs prior to being provided to a data consumer system 108, a hash of an intermediate data set included in fact information associated with the final dataset may be used to identify fact information associated with the intermediate data set (which may also include the same hash). A hash of the original data set included in fact information associated with the intermediate data set may be used to identify fact information associated with the original dataset (which may also include the hash of the original data set).

Identified fact information in the chain-of-handling of the data may be verified and/or authenticated with one or more trusted assertion services 400. By tracing the trusted chain of custody established through the one or more trusted assertion services 400, a data consumer may be assured of, among other things, the identity of the data provider of the original dataset and the identities of data processors later in the chain-of-handling of the data.

Although various embodiments illustrated in FIG. 6 show the data consumer system 108 verifying and/or authenticating fact information associated with a dataset through interactions with the trusted assertion service 400, it will be appreciated that other implementations are also possible. For example, in some embodiments, the data consumer system 108 may request data and/or verification of the data from the data marketplace service 600 and/or a trusted data management platform. The data marketplace service 600 and/or trusted data management platform may then submit a data verification request to the trusted assertion service 400, receive a data verification response from the trusted assertion service 400, and may provide the data verification response and/or an indication of data authenticity and/or integrity reflected in the response along with the requested data to the data consumer system 108.

In at least one non-limiting example, embodiments of the disclosed systems and methods may be used in connection with a service for managing data and/or other information with audio, video, and/or image content. Content authors, creators, and/or other parties with rights to content may register their content with a trusted data management platform. In various embodiments, the content authors, creators, and/or other parties with rights to the content may operate, at least in part, as a data provider. The trusted data management platform may receive the audio, video, and/or image content, ID information associated with the content author, creator, and/or other associated party with rights to the content, as well as a signed signature and/or other access token securely associated with the content author, creator, and/or other associated party with rights to the content.

The trusted data management platform may authenticate and/or otherwise validate the signature and/or other access token. A binding between the content, the ID information associated with the content author, creator, and/or other associated party with rights to the content, and/or timestamp information may be generated by the trusted data management platform.

As used herein, a "binding" of data and/or other information may comprise a variety of forms and/or be generated using a variety of techniques. In some embodiments, binding of data and/or other information may be performed using any technique of associating a plurality of data and/or other information. For example, an associative data structure that associates a plurality of data and/or other information may be used as a binding consistent with various aspects of the disclosed embodiments. In further embodiments, data and/or other information may be concatenated to form a binding.

In various other embodiments, a binding may be formed using only a portion of the subject data and/or other information and/or based on some transformation of the subject data and/or other information and/or a portions thereof. For example, in some embodiments, a binding may be formed by performing a hash operation of subject binding data and/or other information and/or a portions thereof. Thus it will be appreciated that, while in certain examples herein, a binding is described as comprising subject data and/or other information, a wide variety of types of bindings structured and/or generated in a variety of ways may be used without departing from the scope of the inventive body of work.

The trusted data management platform may generate a hash of the binding and sign the hash of the binding with a secure key associated with the trusted data management platform. The trusted data management platform may communicate the signed hash of the binding as an assertion to the trusted assertion service 400 for recordation.

The trusted assertion service 400 may authenticate and/or otherwise validate the signature associated with the received assertion in accordance with one or more policies enforced by the trusted assertion service 400. For example, the trusted assertion service 400 may only allow authenticated assertions and/or constituent information signed by particular trusted platforms to be recorded in the trusted database and/or ledger 502. If the signature of the received assertion is authentic and/or valid, the trusted assertion service 400 may record the hash of the binding in the trusted database and/or ledger 502. The trusted assertion service 400 may further record additional information associated with the recorded hash in the trusted database and/or ledger 502. For example and without limitation, the trusted assertion service 400 may record timestamp information associated with the hash of the binding in the trusted database and/or ledger 502.

A data consumer system 108 such as, for example, a content publisher, may wish to receive content that has an indication and/or other certification of its validity and/or authenticity from the data marketplace service 600 and/or an associated trusted data management platform. The data consumer system 108 may issue a request to the data marketplace service 600 and/or the associated trusted data management platform specifying the requesting content and/or ID information associated with the content author, creator, and/or other associated party with rights to the content. The data marketplace service 600 and/or the associated trusted data management platform may generate a hash of certain information received in the request and, in some embodiments, other information retrieved from a database managed by the data marketplace service 600 and/or the associated trusted data management platform, and issue a data verification request 602 to the trusted assertion service 400 that includes the generated hash. The trusted assertion service 600 may return a data verification response 604 indicating whether the hash was previously recorded in the trusted database and/or ledger 502.

The data marketplace service 600 and/or the associated trusted data management platform may return to the data consumer system 108 (e.g., the content publisher) the requested content and/or the associated ID information associated with the content author, creator, and/or other associated party with rights to the content. The returned response may further comprise timestamp information and/or an indication as to whether the data marketplace service 600 and/or the associated trusted data management platform successfully verified that the associated information was registered by the trusted assertion service 400 (e.g., registered via a previously recorded fact information).

It will be appreciated that a number of variations can be made to the architecture, relationships, and examples presented in connection with FIGS. 1-6 within the scope of the inventive body of work. For example, certain functionalities of a data provider, a trusted data management platform, data processing services, a data marketplace, and/or a trusted assertion service may be performed by and/or otherwise integrated in a single entity, system, and/or service, and/or any suitable combination of entities, systems, and/or services. In at least one non-limiting example, certain functionality provided the data marketplace service and a trusted data management platform may be integrated into a single service. Thus, it will be appreciated that the architecture, relationships, and examples presented in connection with FIGS. 1-6 are provided for purposes of illustration and explanation, and not limitation.

Figure 7:
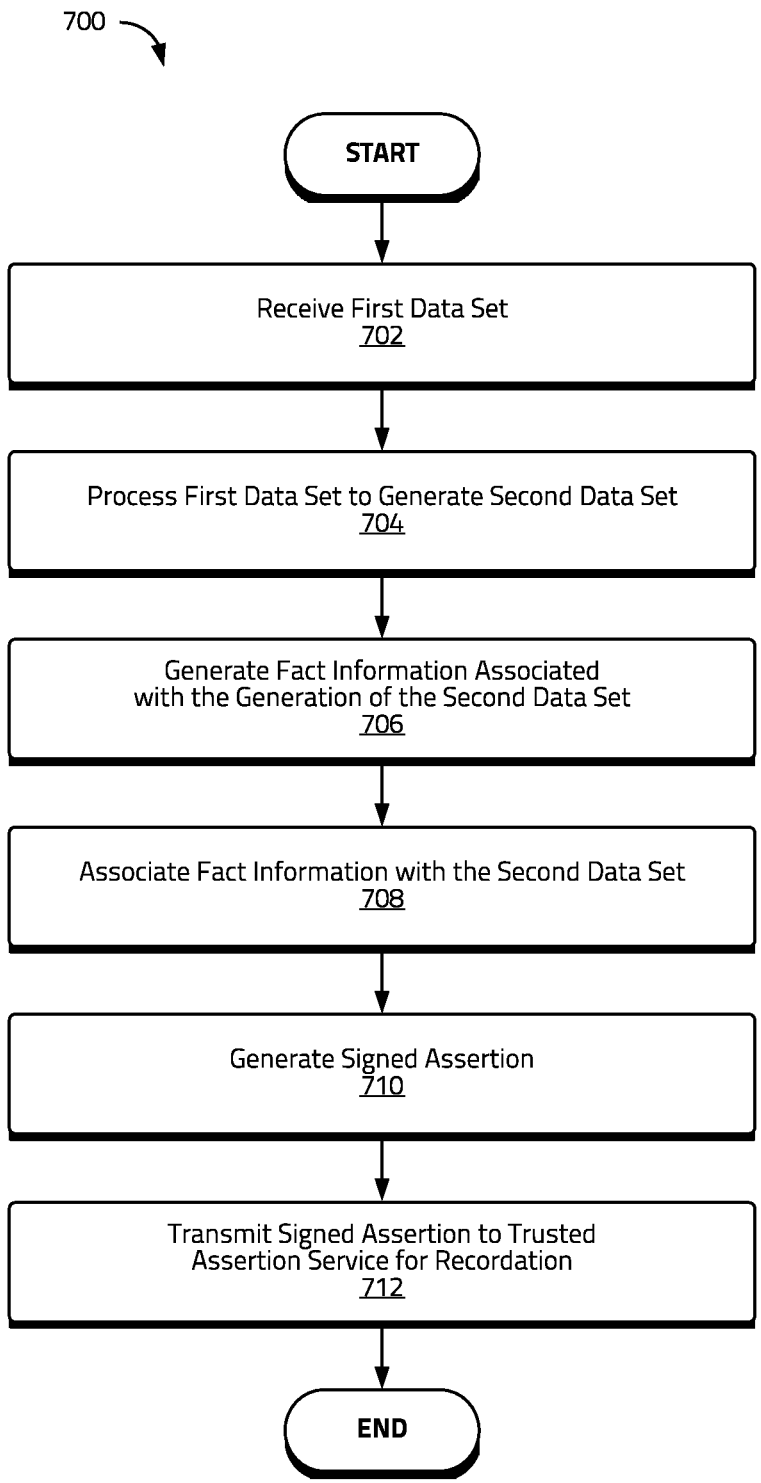
FIG. 7 illustrates a flow chart of an example of a method for generating and/or recording assertion information with a trusted assertion service consistent with various embodiments of the present disclosure.

FIG. 7 illustrates a flow chart of an example of a method 700 for generating and/or recording assertion information with a trusted assertion service consistent with various embodiments of the present disclosure. The illustrated method 700 and/or aspects thereof may be performed by and/or in conjunction with software, hardware, firmware, and/or any combination thereof. In various embodiments, the method 700 may be performed by a trusted data management platform configured to process data and record fact information with a trusted assertion service.

At 702, a first data set may be accessed and/or received. In some embodiments, the first data set may be provided to the trusted data management platform by a data provider. In further embodiments, the first data set may comprise a data set that has been previously processed by the trusted data management platform and/or another entity (e.g., a data processing service and/or the like).

The first data set may be processed by the trusted data management platform using a data processing program to generate a second data set at 704. The first data set may be processed and/or transformed in a variety of ways including using any of the data processing and/or transformation operations described herein. In some embodiments, the data processing program may be provided to the trusted data management platform by a data processing service.

At 706, fact information associated with the second data set may be generated. The fact information may comprise a variety of information associated with the second data set including, for example and without limitation, one or more of identifying information relating to the data processing program and/or associated service used to generate the second data set, a hash of the first data set and/or a portion thereof, a hash of the second data set and/or a portion thereof, timestamp information (e.g., timestamp information associated with the generation of the second data set), configuration and/or condition information relating to the generation of the second data set, and/or description and/or other information detailing changes, transformations, and/or processes were applied on the first data set to generate the second data set. The generated fact information may be associated with the second data set by the trusted data management platform at 708.

At 710, an assertion may be generated by the trusted data management platform associated with the generation of the second data set. In some embodiments, the assertion may comprise a hash of the fact information generated at 706 and/or a portion thereof and at least one digital signature (e.g., a digital signature over the hash). For example, in some embodiments, the assertion may be signed using a key associated with the trusted data management platform. The assertion may in addition and/or alternatively be signed using a key associated with the data processing program used to generate the second data set and/or an associated data processing service.

Consistent with embodiments disclosed herein, the signed data assertion may be communicated to a trusted assertion service at 712. The trusted assertion service may authenticate any associated signatures and record authenticated assertion information (e.g., included hash information) in an assertion database and/or ledger managed by the trusted assertion service if the associated signature(s) is/are successfully authenticated.

Figure 8:
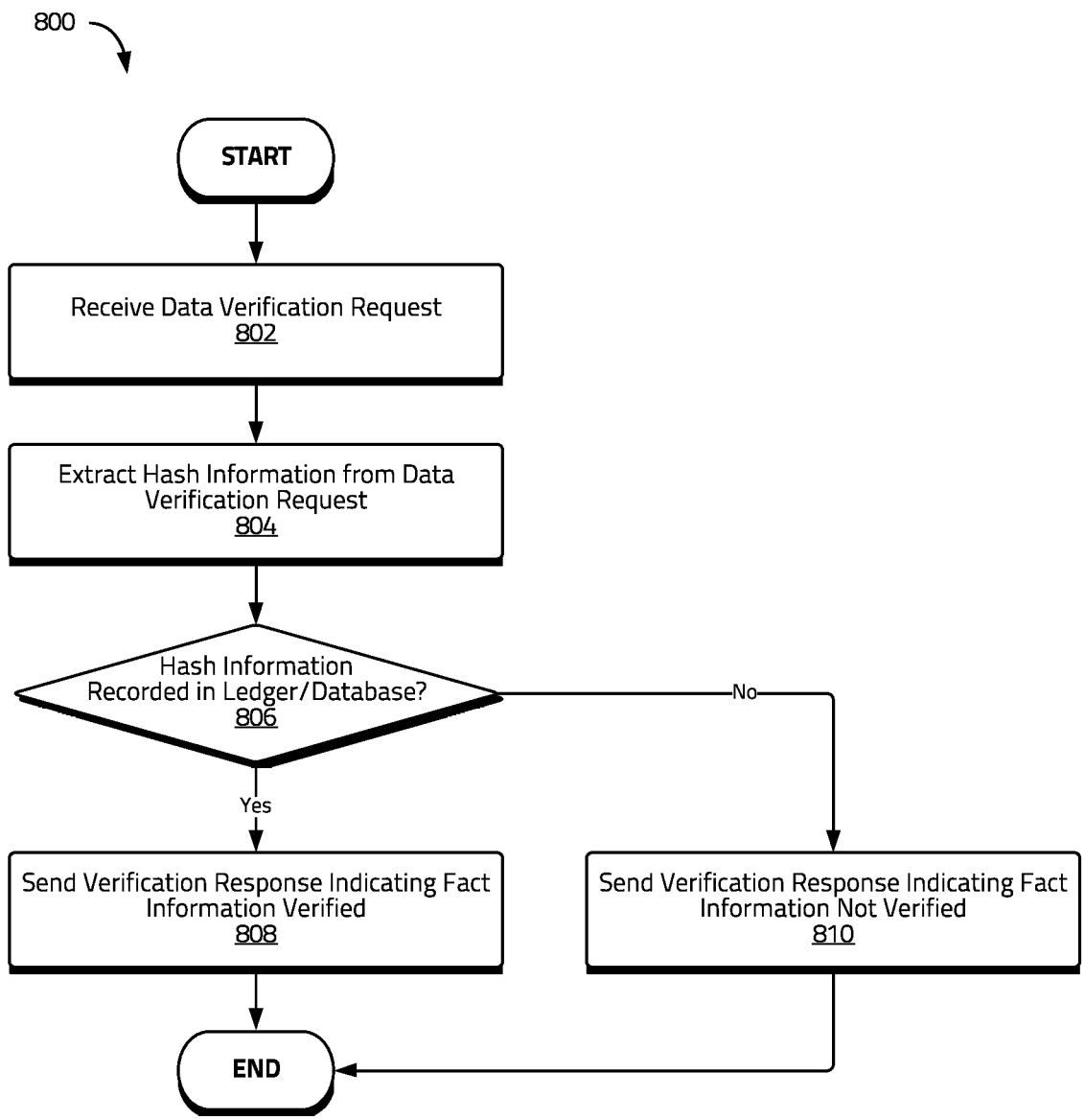
FIG. 8 illustrates a flow chart of an example of a method for verifying information associated with data and/or processed data sets using a trusted assertion service consistent with various embodiments of the present disclosure.

FIG. 8 illustrates a flow chart of an example of a method 800 for verifying information associated with data and/or processed data sets using a trusted assertion service consistent with various embodiments of the present disclosure. The illustrated method 800 and/or aspects thereof may be performed by and/or in conjunction with software, hardware, firmware, and/or any combination thereof. In various embodiments, the method 800 may be performed by a trusted assertion service configured to authenticate and/or verify fact information associated with data.

At 802, a data verification request may be received from a data consumer system by the trusted assertion service requesting verification of fact information associated with data. Hash information included in the data verification request may be extracted from the request at 804. The extracted hash information may be compared with one or more entries in an assertion ledger and/or database managed by the trusted assertion service to determine whether the extracted hash information has been previously recorded in the assertion ledger and/or database at 806. If the hash information has been recorded in the assertion ledger and/or database, the trusted assertion service may return at 808 a data verification response to the data consumer system indicating the fact information was validated by the trusted service. If the hash information has not been recorded in the assertion ledger and/or database, however, the trusted assertion service may return at 810 a data verification response indicating the fact information was not validated by the trusted service.

Various embodiments of the disclosed systems and methods may be used in connection with managing electronic content including, for example and without limitation, audio, video, written, and/or image content, and/or other related data. Content creators, owners, and/or other parties having rights to content may wish to ensure that their rights to their content are respected. Moreover, content publishers and/or other entities, such as a PROs, may wish to ensure that the content they publish and/or otherwise interact with is authentic and/or that they respect the rights of associated rightsholders.

Consistent with certain embodiments of the disclosed systems and methods, content creators and/or other participants in a content ecosystem may interact with a trusted data management platform and/or a trusted assertion service, among other entities, to manage content and/or verify the integrity, provenance, and/or chain-of-handling of content and/or associated data. For example, in various embodiments, content creators and/or other parties having rights to content may register their content and/or associated rights using a trusted data management platform and/or a trusted assertion service.

Figure 9A:
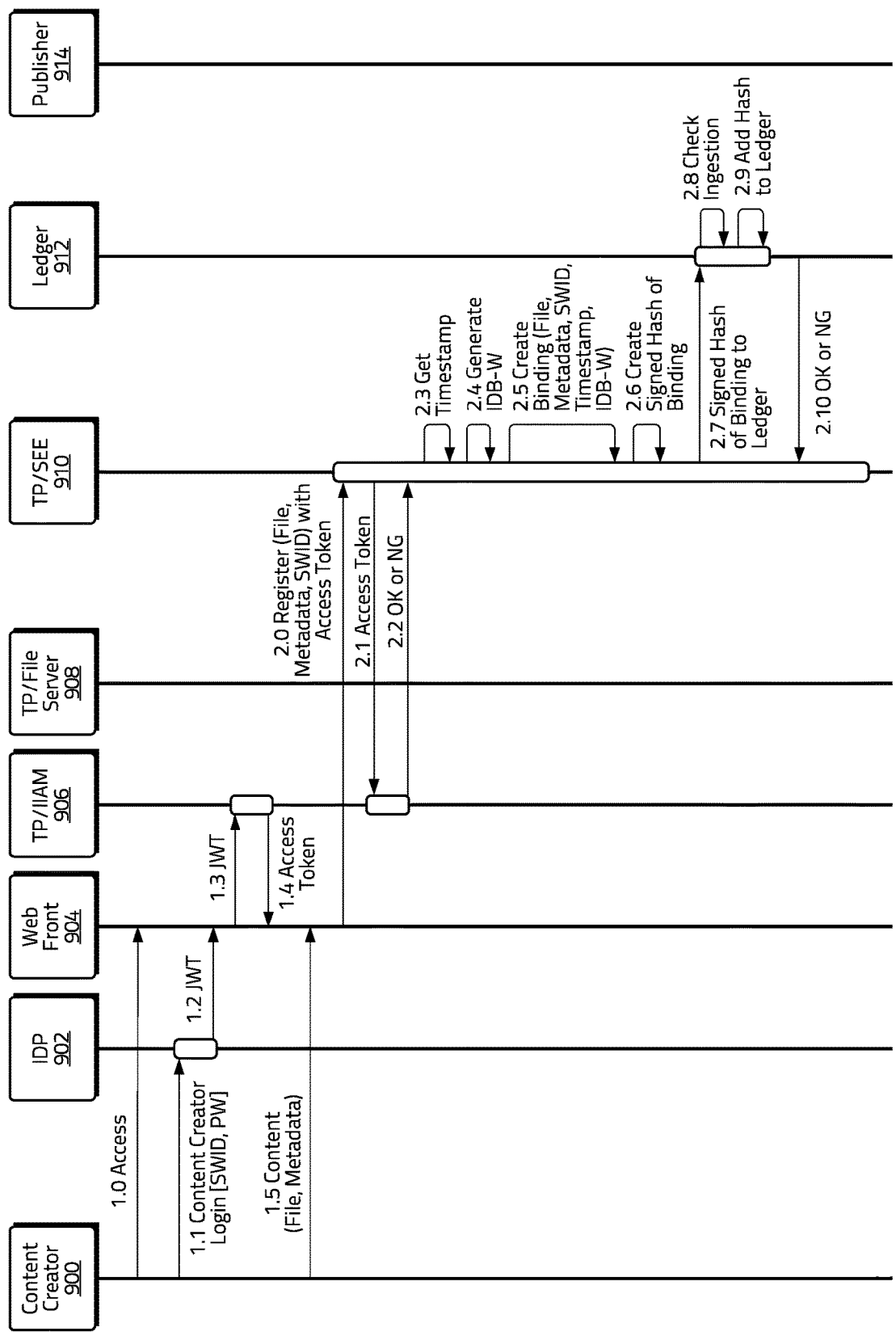
FIG. 9A illustrates a first part of an example of a process of registering content and/or associated rights using a trusted data management platform and/or a trusted assertion service consistent with various embodiments of the present disclosure.
Figure 9B:
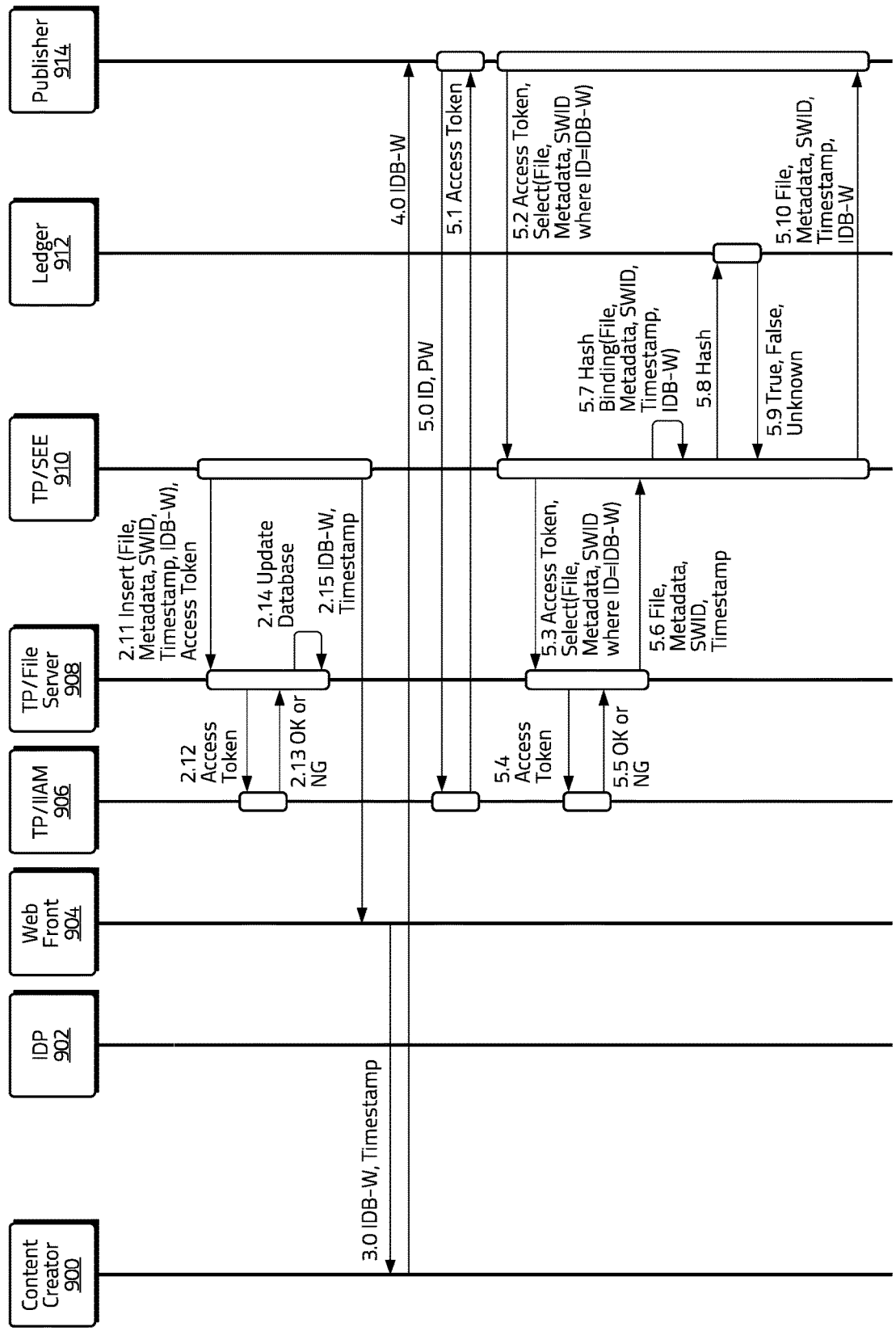
FIG. 9B illustrates a second part of an example of a process for registering content and/or associated rights using a trusted data management platform and/or a trusted assertion service consistent with various embodiments of the present disclosure.

FIGS. 9A-9B illustrate an example of a process of registering content and/or associated rights using a trusted data management platform and/or a trusted assertion service consistent with various embodiments of the present disclosure. A variety of entities and/or ecosystem participants may engage in various aspects of the illustrated process including, for example and without limitation, a content creator 900, a content registration web front service 904, an ID management provider service ("IDP") 902, an intelligent identity and access management ("IIAM") service 906, a file server 908, a trusted and/or otherwise secure execution environment ("SEE") 910, a trusted ledger and/or database (e.g., a trusted immutable data assertion ledger ("TIDAL")) 912, and/or a trusted data management platform (which in certain instances herein and in the figures may be abbreviated as "TP").

Various functionality of the systems, services, entities, and/or execution environments illustrated in the figures and described herein may be integrated into and/or otherwise performed by single systems and/or services and/or any suitable combination of multiple systems and/or services. For example, in some embodiments, the IIAM service 906, file server 908, and/or SEE 910, may be associated with and/or otherwise implemented and/or managed by a single TP.

In addition, certain embodiments disclosed herein, including those illustrated in FIGS. 9A-9B and elsewhere in the figures, are described in connection with a content creator that may be a songwriter and/or an associated entity and content that comprises audio content. It will be appreciated that various aspects of the disclosed embodiments may, however, be used in connection with a variety of types of content (e.g., audio, video, image, and/or written content, etc.) and/or in connection with other types content creators, generators, and/or other parties having rights to content. Moreover, although various examples describe actions performed by a content creator, it will be appreciated that other parties may engage in the same and/or similar interactions that may not necessarily be creators of content, but may be content distributors, managers, and/or other parties having interest and/or rights to content within a content ecosystem.

Referring to FIG. 9A, a process for registering content and/or associated information may include:

1.0—A content creator 900 such as, for example and without limitation, a songwriter may issue an access request to a content registration service web front 904.

1.1—The songwriter and/or other content creator 900 may forward to an IDP service 902 and/or otherwise may provide the IDP service 902 with login information that may comprise an identifier and/or other authentication credentials. For example, a songwriter may provide the IDP service 902 with a songwriter ID ("SWID") and/or a password.

1.2—If the IDP service 902 determines that the login information is associated with an authorized user, the IDP service 902 may issue a JSON web token ("JWT") to the content registration service web front 904.

1.3—The content registration service web front 904 may forward the JWT to an IIAM service 906, which may be associated with a TP.

1.4—If the JWT is associated with an authenticated user, the IIAM service 906 may return an access token to the content registration service web front 904.

1.5—The songwriter and/or other content creator 900 may communicate content they wish to register to the content registration service web front 904. In some embodiments, the content may comprise a file corresponding to the content and/or associated metadata information. For example, a songwriter may communicate a song file and associated metadata to the content registration service web front 904.

2.0—The content registration service web front 904 may forward a registration request to a trusted content registration program executing within a SEE 910 of the TP. The registration request may comprise one or more of the content file, associated metadata, and/or the SWID and/or other content creator identifier. The request may further include the access token issued by the IIAM service 906.

2.1—The access token may be forwarded by the trusted program executing within the SEE 910 of the TP to the IIAM service 906 for authentication.

2.2—The IIAM service 906 may return an indication to the trusted program executing within the SEE 910 indicating whether the access token was authenticated (e.g., OK and/or not good—("NG")).

2.3—If the access token was authenticated by the IIAM service 906, the trusted program executing within the SEE 910 of the TP may retrieve and/or generate timestamp information.

2.4—The trusted program executing within the SEE 910 may generate a unique binding ID associated with the content. In some embodiments, this binding ID may be referred to as a binding ID for a particular work ("IDB-W").

2.5—The trusted program executing within the SEE 910 may create a binding that comprises one or more of the content (e.g., the content file), associated metadata, content creator and/or content rightsholder identification information, content identification information, and/or timestamp information. For example, a binding may be generated that includes an audio content file, associated metadata, the SWID of the content creator 900, the generated timestamp information, and the IDB-W for the particular work.

2.6—A signed hash of the binding may be created by the trusted program executing within the SEE 910. In some embodiments, the signed hash of the binding may be signed with a secure key associated with the trusted program. The secure key may be protected by the SEE 910 using secure hardware and/or using other key protection techniques implemented by the program such as, for example and without limitation, whitebox cryptographic protection techniques.

2.7—The signed hash of the binding may be communicated to a ledger service 912, which may be implemented by the TP. In some embodiments, the ledger may comprise a TIDAL, although other suitable types of ledgers and/or databases may also be used. In further embodiments, the ledger service 912 may be separate from the TP and be managed by a trusted assertion service.

2.8—The ledger service 912 may determine whether the signed hash of the binding can be recorded in the ledger in accordance with policy associated with the ledger and/or database maintained by the ledger service 912. For example, the ledger service 912 may determine whether the signature associated with the signed hash is associated with an authorized program and/or entity permitted to record information in the ledger and/or database.

2.9—If the entry ingestion policy is satisfied (e.g., the signature is associated with an authorized program), the ledger service 912 may add the hash of the binding to the ledger and/or database.

2.10—The ledger service 912 may communicate an indication to the program executing within the SEE 910 indicating whether the hash of the binding was entered into the ledger and/or database (e.g., OK or NG).

Referring to FIG. 9B, the process for registering content and/or associated information may further include:

2.11—The program executing with the SEE 910 may communicate a content insertion request to a file server 908. In some embodiments, the file server 908 may be implemented by and/or otherwise be associated with the TP. In further embodiments, the file server 908 may be a separate file server in communication with and/or managed by the TP. The insertion request may comprise one or more of the content (e.g., the content file), associated metadata, content creator and/or content rightsholder identification information, content identification information, and/or the previously received access token. For example, a binding may be generated that includes an audio content file, associated metadata, the SWID of the content creator 900, the access token received from the IIAM service 906, and the IDB-W for the particular work. In some embodiments, the content insertion request may further include timestamp information.

2.12—The file server 908 may forward an access token included in the content insertion request to the IIAM service 906 for authentication.

2.13—The IIAM service 906 may return an indication to the file server 908 indicating whether the access token was authenticated (e.g., OK and/or NG).

2.14—If the IIAM service 906 authenticates the access token, the file server 908 may update a database it manages to include the information included in the insertion request, including the content file. Although not specifically illustrated, in some embodiments, the file server 908 may return a confirmation to the program executing within the SEE 910 that the database has been updated and/or that the content file has been successfully included in the database of the file server 908.

2.15—The program executing within the SEE 910 may return the content identification information and timestamp to the content registration service web front 904. For example, as illustrated, the IDB-W for the particular content and the timestamp information may be communicated to the content registration service web front 904.

3.0—The content registration service web front 904 may return an indication of the content identification information and the timestamp information to the content creator and/or other rightsholder 900. For example, as illustrated, the IBD-W for the content and the timestamp information may be communicated to a songwriter content creator 900.

4.0—The content creator and/or other rightsholder 900 may provide the content identification information to a publisher service 914. For example, a songwriter content creator 900 may provide the IDB-W for the content to the publisher service 914.

5.0—In various embodiments, the publisher service 914 may be interested in accessing the content for publication and/or authenticating certain rights and/or other information associated with the content. The publisher service 914 may provide authentication information to the IIAM service 906. For example, in some embodiments, the publisher service 914 may communicate ID and/or password information to the IIAM service 906 for authentication.

5.1—If the IIAM service 906 authenticates the publisher service 914, it may return an access token to the publisher service 914.

5.2—The publisher service 914 may provide the received access token along with an indication of selected and/or otherwise requested content and/or associated information to the program executing within the SEE 910 of the TP. For example, as illustrated, the publisher service 914 may provide the program executing within the SEE 910 with an indication of the audio content, metadata, the SWID, and/or the IDB-W associated with the selected/requested content.

5.3—The program executing within the SEE 910 may communicate the access token along with the indication of the selected and/or otherwise requested content to the file server 908. Although not specifically illustrated, the program executing within the SEE 910 may also authenticate the access token of the publisher with the IIAM service 906.

5.4—The file server 908 may forward the publisher access token to the IIAM service 906 for authentication.

5.5—The IIAM service 906 may return an indication to the file server 908 indicating whether the publisher access token was authenticated (e.g., OK and/or NG).

5.6—If the publisher access token was authenticated, the file server 908 may return the content, associated data, content creator identification information, and/or timestamp information to the program executing within the SEE 910. For example, the file server 908 may return audio content, associated metadata, a SWID, and timestamp information to the program executing within the SEE 910.

5.7—The program executing within SEE 910 may generate a hash of a binding that comprises one or more of the content, associated metadata, content creator identification information, timestamp information, and/or content identification information. For example, as illustrated, a binding of the audio content, associated metadata, the SWID, the timestamp information, and the IDB-W may be generated.

5.8—The generated hash of the binding may be communicated to the ledger service 912 by the program executing within the SEE 910 for verification. In some embodiments, this may be as part of query to determine whether the ledger and/or database maintained by the ledger service 912 includes the hash of the binding.

5.9—The ledger service 912 may return to the program executing within the SEE 910 an indication regarding whether the hash has been recorded in the ledger and/or database maintained by the ledger service 912 (e.g., "true", whether the hash has not been recorded in the ledger and/or database (e.g., "false"), and/or whether there is some indication of tampering (e.g., "unknown"). In various embodiments, the returned indication may provide an indication as to the integrity and/or authenticity of the content and/or associated information.

5.10—If the ledger service 912 returns an indication indicating that the content is authenticated and/or valid, the content may be provided to the publisher service 914 along with associated information. For example, the program executing within the SEE 910 may provide the publisher with the audio content file, associated metadata, an SWID, timestamp information, and/or an IDB-W.

Content publishers and/or other entities participating in a content ecosystem, such as a PRO, may be interested in ensuring that the content they publish and/or otherwise interact with is authentic and that they respect the rights of content generators, owners, and/or other parties having interests in the content. For example, in some embodiments, a PRO may interact with a trusted data management platform to identify whether certain assertions associated with content have been recorded by a trusted ledger and/or ascertain information relating to rights associated with the content.

Figure 10A:
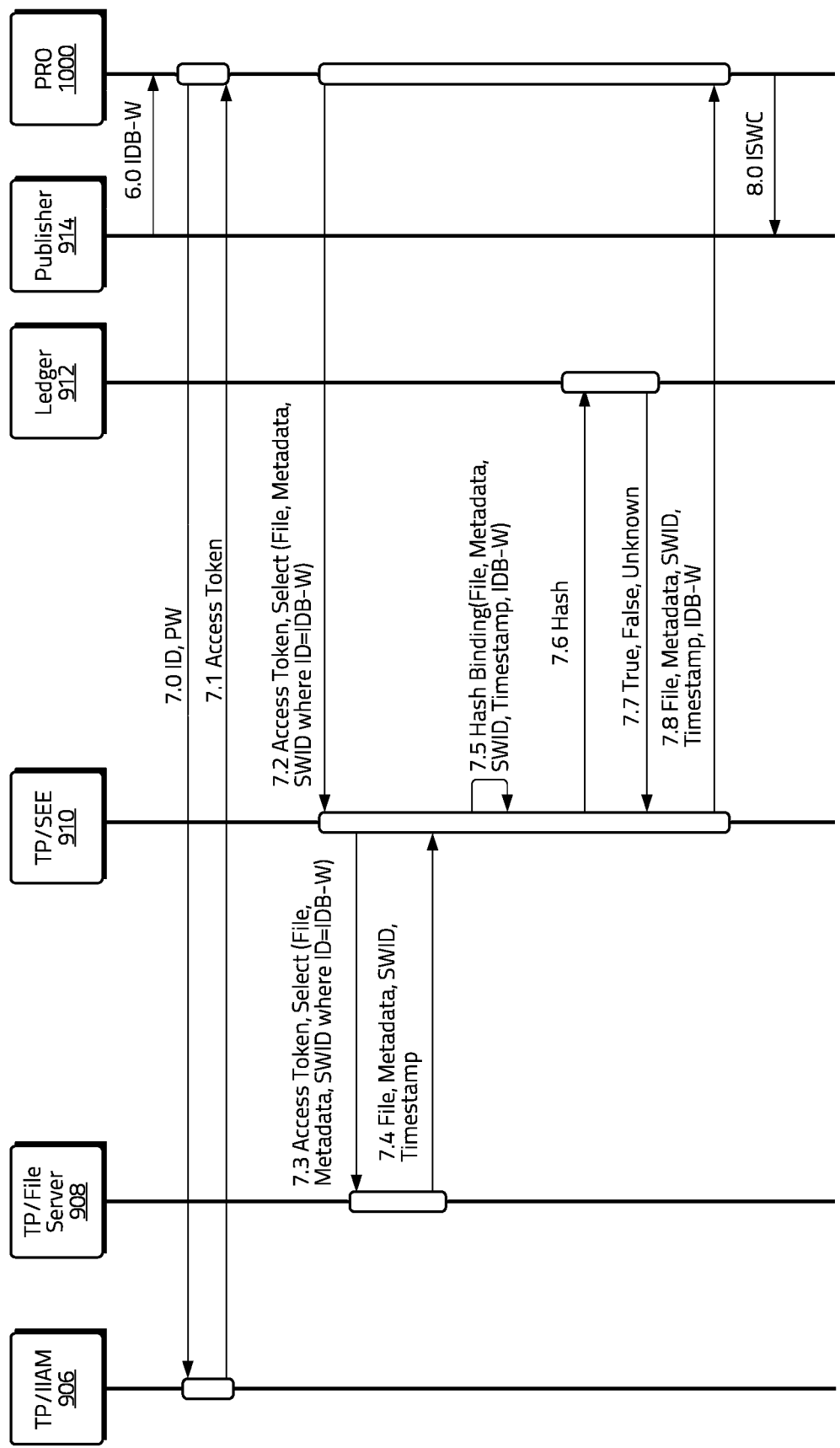
FIG. 10A illustrates a first part of an example of a process for verifying rights associated with content involving a PRO consistent with various embodiments of the present disclosure.
Figure 10B:
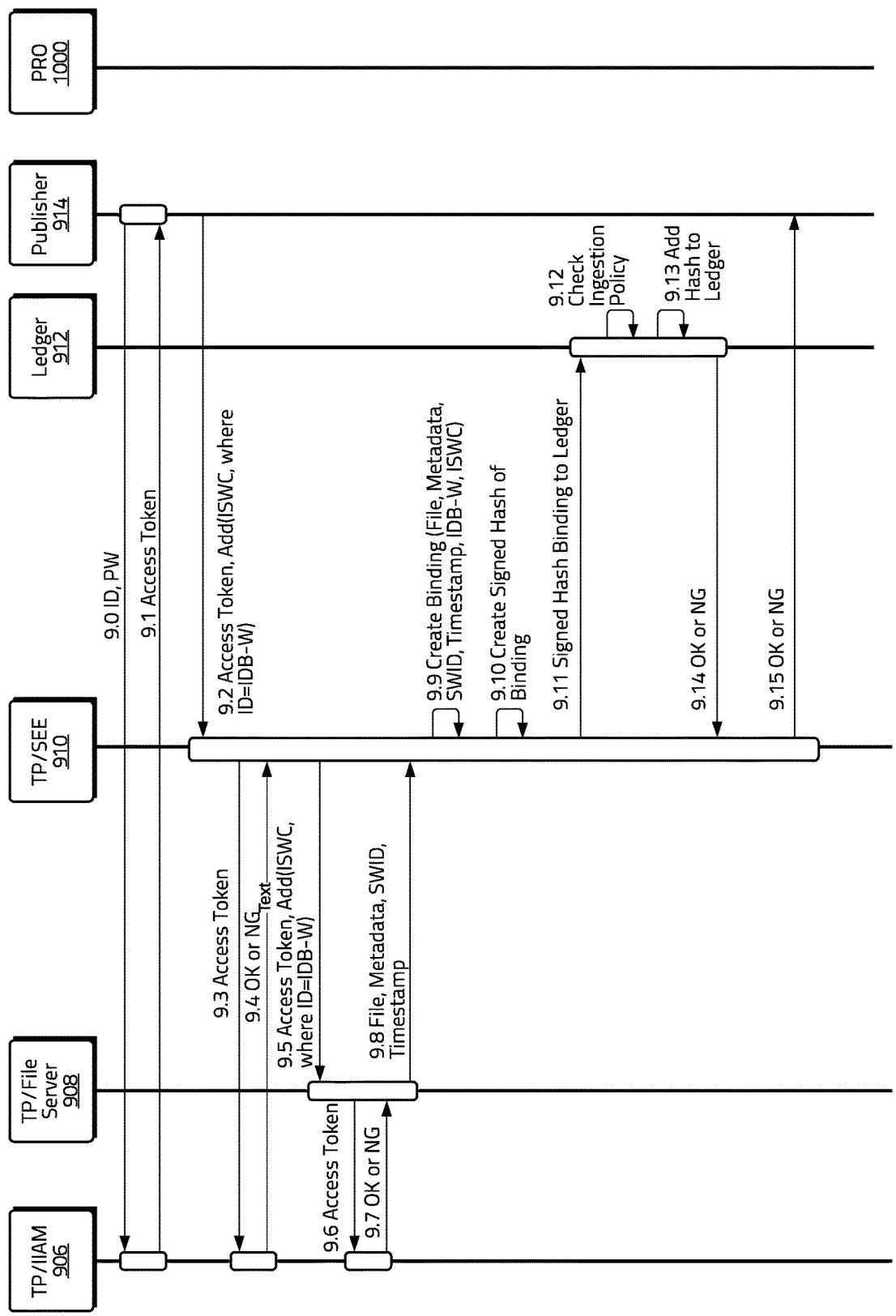
FIG. 10B illustrates a second part of an example of a process for verifying rights associated with content involving a PRO consistent with various embodiments of the present disclosure.

FIGS. 10A-10B illustrate an example of a process for verifying rights associated with content involving a PRO consistent with various embodiments of the present disclosure. Referring to FIG. 10A, which illustrates a first part a process for verifying rights associated with content by a PRO service 1000, the process may include:

6.0—A publisher service 914 may communicate content identification information to a PRO service 1000. For example, the publisher service 914 may communicate an IDB-W associated with a particular audio content work to a PRO service 1000.

7.0—The PRO service 1000 may provide authentication information to the IIAM service 906 for authentication. For example, in various embodiments, the PRO service 1000 may provide ID and/or associated password information to the IIAM service 906 for authentication.

7.1—If the IIAM service 906 authenticates the PRO service 1000, it may return an access token to the PRO service 1000.

7.2—The PRO service 1000 may provide the received access token along with an indication of selected and/or otherwise requested content to the program executing within the SEE 910 of the TP. For example, in some embodiments, the indication may comprise an indication of the audio content, metadata, the SWID, and/or the IDB-W associated with the selected/requested content.

7.3—The program executing within the SEE 910 may communicate the access token associated with the PRO service 1000 along with the indication of the selected and/or otherwise requested content to the file server 908. Although not specifically illustrated, the program within the SEE 910 may also authenticate the access token of the PRO service 1000 with the IIAM service 906.

7.4—The file server 910 may return the content file, associated information, content creator and/or rightsholder identification information, and/or timestamp information to the program executing within the SEE 910. For example, as illustrated, the file server 908 may return a requested audio content file, associated metadata, an SWID associated with the audio content file, and/or timestamp information to the program executing within the SEE 910.

7.5—The program executing within the SEE 910 may generate a hash of a binding that comprises one or more of the content file, associated metadata, content creator and/or rightsholder identification information, timestamp information, and/or content identification information. For example, in some embodiments, a hash may be generated of a binding that comprises the audio content, associated metadata, a SWID, the timestamp information, and the IDB-W associated with the content.

7.6—The hash of the binding may be communicated to the ledger service 912 for verification.

7.7—The ledger service 912 may return to the program executing within the SEE 910 an indication as to whether the hash is included in the ledger and/or database maintained by the ledger service 912 (e.g., true), whether the hash is not included in the ledger and/or database (e.g., false), and/or whether there is some indication of tampering (e.g., unknown). This indication may provide an indication as to the integrity and/or authenticity of the content and/or associated information.

7.8—If the ledger service 912 returns an indication that the content is authenticated and/or valid, the content file may be provided to the PRO service 1000, potentially along with other associated information. For example, in some embodiments, audio content may be returned to the PRO service 1000 by the trusted program executing within the SEE 910 along with associated metadata, SWID associated with the songwriter and/or other rightsholder, timestamp information, and/or the IDB-W associated with the content.

8.0—The PRO service 1000 may communicate to the publisher 914 an assigned identifier and/or reference ID associated with the content. For example, as illustrated, the PRO service 1000 may communicate an International Standard Musical Work Code ("ISWC") to the publisher service 914. In various embodiments, the ISWC may comprise a unique, permanent, and/otherwise recognized (e.g., internationally recognized) reference number for the identification of musical works and/or content.

In some embodiments, the publisher service 914 may wish to register the assigned identifier and/or reference ID associated with the content with the ledger service 912. Referring to FIG. 10B, the process for verifying rights associated with content may further include:

9.0—The publisher service 914 may provide authentication information (e.g., ID information and/or password information) to the IIAM service 906 for authentication.

9.1—If the IIAM service 906 authenticates the publisher service 914, it may return an access token to the publisher service 914.

9.2—The publisher service 914 may wish to add the assigned identifier and/or reference ID associated with the content to the trusted ledger and/or database maintained by the ledger service 912. For example, in some embodiments, the publisher service 914 may wish to add the ISWC to the ledger and/or database maintained by the ledger service 912. In some embodiments, the publisher service 914 may further wish to add the assigned identifier and/or reference ID associated with the content (e.g., the ISWC) to the ledger and/or database maintained by the file server 908. In some embodiments, the publisher service 914 may provide the trusted program executing within the SEE 910 with an add request that comprises associated identifier information. For example, as illustrated, the add request may comprise an ISWC and/or IDB-W associated with audio content. The add request may further include and/or be communicated with the publisher access token.

9.3—The program executing within the SEE 910 may forward the publisher access token to the IIAM service 906 for authentication.

9.4—The IIAM service 906 may return an indication to the program executing within the SEE 910 indicating whether the publisher access token was successfully authenticated (e.g., OK and/or NG).

9.5—The program executing within the SEE 910 may communicate the publisher access token along with the add request to the file server 908. For example, as illustrated, the program executing within the SEE 910 may communicate the publisher access token along with an add request comprising the ISWC and associated IDB-W to the file sever 908.

9.6—The file server 908 may forward the publisher access token to the IIAM service 906 for authentication.

9.7—The IIAM service 906 may return an indication to the file server 908 indicating whether the publisher access token was authenticated (e.g., OK and/or NG).

9.8—If the publisher access token was authenticated, the file server 908 may return the content file, associated metadata, content creator and/or rightsholder identification information, and/or timestamp information to the program executing within the SEE 910. For example, as illustrated, the file server 908 may return the audio content file and associated metadata, SWID, and timestamp information the program executing within the SEE 910.

9.9—The program executing within the SEE 910 may create a binding that comprises one or more of the content file, associated metadata, content creator and/or rights holder identification information, timestamp information, and/or one or more content identifiers. In at least one non-limiting example, the binding may comprise an audio content file, associated metadata information, SWID, timestamp information, a corresponding IDB-W associated with the audio content, and/or a corresponding ISWC associated with the audio content.

9.10—A signed hash of the binding may be generated. In some embodiments, the signed hash of the binding may be signed with a secure key associated with the program executing with the SEE 910. The secure key may be protected by the SEE 910 using secure hardware and/or using other key protection techniques implemented by the trusted program such as, for example and without limitation, whitebox cryptographic protection techniques.

9.11—The signed hash of the binding may be communicated to a ledger service 912 maintaining a trusted ledger and/or database. In some embodiments, the ledger may comprise a TIDAL, although other suitable types of trusted ledgers and/or databases may also be employed. As described above, the ledger service 912 may be implemented by the TP and/or by a separate trusted service such as, for example and without limitation, a trusted assertion service.

9.12—The ledger service 912 may determine whether the signed hash of the binding can be recorded in accordance with policy associated with the ledger and/or database maintained by the ledger service 912. For example, the ledger service 912 may determine whether the signature associated with the signed hash is associated with an authorized program and/or entity permitted to record information in the ledger and/or database.

9.13—If the entry ingestion policy is satisfied (e.g., the signature is associated with an authorized program), the ledger service 912 may add the hash of the binding to the ledger and/or database.

9.14—The ledger service 912 may communicate an indication to the program executing within the SEE 910 whether the hash of the binding was entered into the ledger and/or database.

9.15—In turn the program executing with the SEE 910 may return an indication to the publisher service 914 indicating whether the hash of the binding was entered into the ledger and/or database and/or the ISWC was otherwise recorded.

In various further embodiments, a DRM service may interact with a trusted data management platform and/or a trusted assertion service to verify and/or otherwise manage rights associated with content. For example, in some embodiments, content files may be protected using a DRM service that operates in connection with a TP and/or trusted assertion service maintaining a trusted ledger and/or database to manage licenses and/or rights associated with content. In various embodiments, a TP and/or an associated SEE may handle content key related transactions in a manner such that a content key is not exposed outside a protected environment of the TP and/or an associated SEE.

Figure 11A:
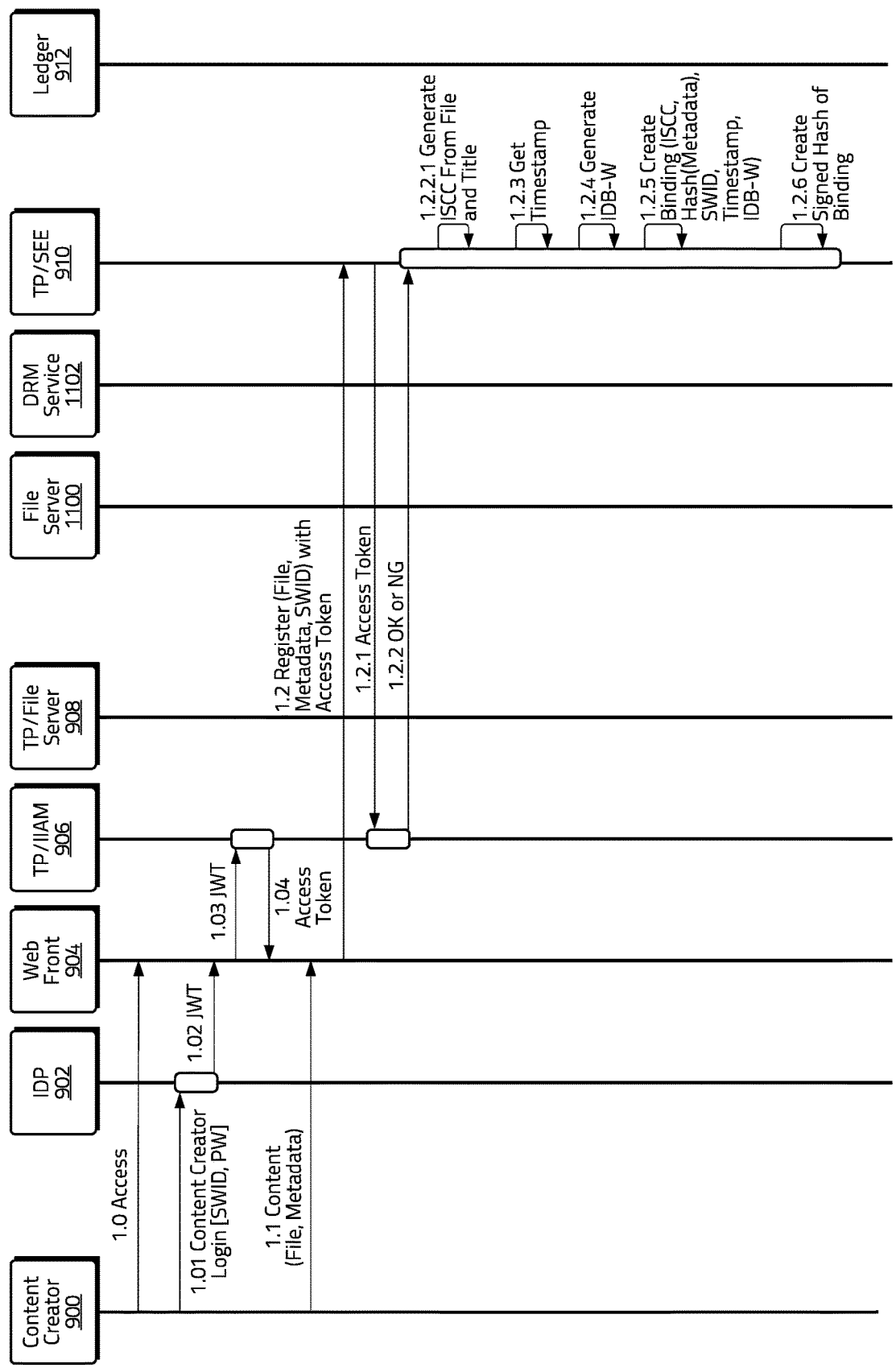
FIG. 11A illustrates a first part of an example of a content management process involving a DRM service consistent with various embodiments of the present disclosure.
Figure 11B:
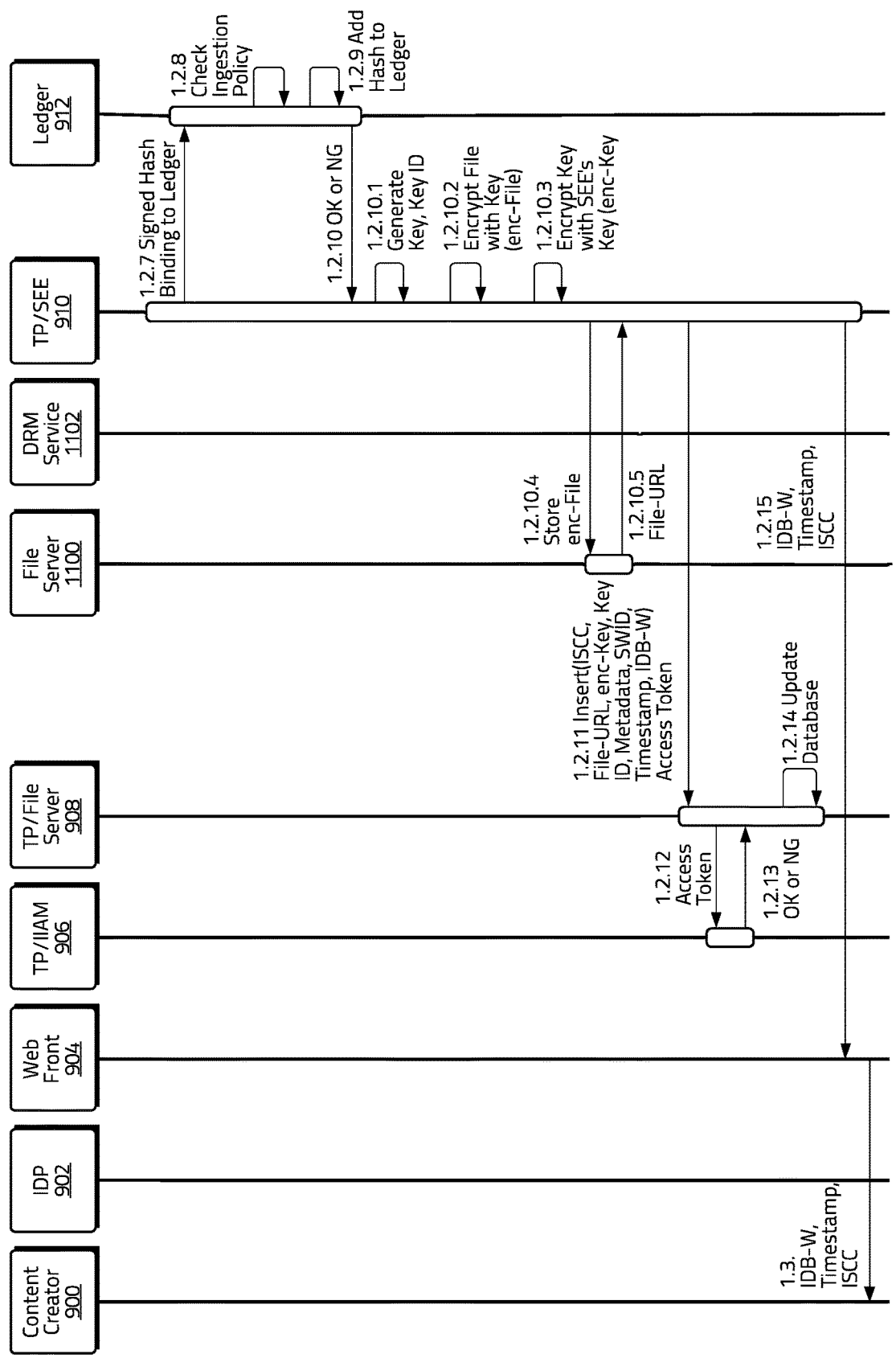
FIG. 11B illustrates a second part of an example of a content management process involving a DRM service consistent with various embodiments of the present disclosure.

FIG. 11A-11B illustrate an example of a content management process involving a DRM service consistent with various embodiments of the present disclosure. A variety of entities and/or ecosystem participants may engage in various aspects of the illustrated process including, for example and without limitation, a content creator and/or other rightsholder 900, a content registration web front service 904, an IDP service 902, an IIAM service 906, file servers 908 and 1100, a DRM service 1102, an SEE 910, a trusted ledger and/or database service 912, and/or a TP.

As discussed above, various functionality of the systems, services, entities, and/or execution environments illustrated in the figures and described herein may be integrated into and/or otherwise performed by single systems and/or services and/or any suitable combination of multiple systems and/or services. For example, in some embodiments, one or more of the IIAM service 906, one or more of file servers 908 and 1100, and/or the SEE 910 may be associated with and/or otherwise implemented and/or managed by a single TP. Moreover, it will be appreciated that in some embodiments, functionality of file servers 908 and 1100 may be integrated into a single file server.

Referring to FIG. 11A, a process for registering content and/or associated information may include:

1.0—A content creator and/or other rightsholder 900 such as, for example and without limitation, a songwriter may issue an access request to a content registration service web front 904.

1.01—The songwriter and/or other content creator 900 may forward to an IDP service 902 and/or otherwise may provide the IDP service 902 with login information that may comprise an identifier and/or other authentication credentials. For example, a songwriter may provide the IDP service 902 with an SWID and/or a password.

1.02—If the IDP service 902 determines that the login information is associated with an authorized user, the IDP service 902 may issue a JWT to the content registration service web front 904.

1.03—The content registration service web front 904 may forward the JWT to an IIAM service 906, which may be associated with a TP.

1.04—If the JWT is associated with an authenticated user, the IIAM service 906 may return an access token to the content registration service web front 904.

1.1—The content creator and/or other rightsholder 900 may communicate content they wish to register to the content registration service web front 904. In some embodiments, the content may comprise a file corresponding to the content and/or associated metadata information. For example, a songwriter may communicate a song file and associated metadata to the content registration service web front 904.

1.2. —The content registration service web front 904 may forward a registration request to a trusted content registration program executing within a SEE 910 of the TP. The registration request may comprise one or more of the content file, associated metadata, and/or the SWID and/or other content creator identifier. The request may further include the access token issued by the IIAM service 906.

1.2.1—The access token may be forwarded by the trusted program executing within the SEE 910 of the TP to the IIAM service 906 for authentication.

1.2.2—The IIAM service 906 may return an indication to the trusted program executing within the SEE 910 indicating whether the access token was authenticated (e.g., OK and/or not good—("NG")).

1.2.2.1—If the access token was authenticated by the IIAM service 906, the trusted program executing within the SEE 910 of the TP may generate an International Standard Content Code ("ISCC") and/or another identifier (and/or may interact with another service to generate such an identifier) associated with the content and/or title information associated with the content.

1.2.3—The program executing within the SEE 910 of the TP may retrieve and/or generate timestamp information.

1.2.4—The trusted program executing within the SEE 910 may generate a unique binding ID associated with the content (e.g., an IDB-W).

1.2.5—The trusted program executing within the SEE 910 may create a binding that comprises one or more of the ISCC, a hash of the associated content metadata, the SWID and/or other content creator identifier, the timestamp information, and the IDB-W for the particular work.

1.2.6—A signed hash of the binding may be created by the trusted program executing within the SEE 910. In some embodiments, the signed hash of the binding may be signed with a secure key associated with the trusted program and/or the SEE 910. The secure key may be protected by the SEE 910 using secure hardware and/or using other key protection techniques implemented by the program such as, for example and without limitation, whitebox cryptographic protection techniques.

Referring to FIG. 11B, the process for registering content and/or associated information may further include:

1.2.7—The signed hash of the binding may be communicated to a ledger service 912, which may be implemented by the TP. In some embodiments, the ledger may comprise a TIDAL, although other suitable types of ledgers and/or databases may also be used. In further embodiments, the ledger service 912 may be separate from the TP and be managed by a trusted assertion service.

1.2.8—The ledger service 912 may determine whether the signed hash of the binding can be recorded in the ledger in accordance with policy associated with the ledger and/or database maintained by the ledger service 912. For example, the ledger service 912 may determine whether the signature associated with the signed hash is associated with an authorized program and/or entity permitted to record information in the ledger and/or database.

1.2.9—If the entry ingestion policy is satisfied (e.g., the signature is associated with an authorized program), the ledger service 912 may add the hash of the binding to the ledger and/or database.

1.2.10—The ledger service 912 may communicate an indication to the program executing within the SEE 910 indicating whether the hash of the binding was entered into the ledger and/or database (e.g., OK or NG).

1.2.10.1—The trusted program executing within the SEE 910 may generate a content key and an associated content key identifier.

1.2.10.2—The trusted program executing within the SEE 910 may encrypt the content file with the generated content key.

1.2.10.3—The trusted program executing within the SEE 910 may encrypt the content key with a key associated with the SEE 910. In some embodiments, the key associated with the SEE 910 may be protected by and/or otherwise not exposed outside the SEE 910 (e.g., using secure hardware protection techniques and/or software-based cryptographic protection techniques). The key associated with the SEE 910 may comprise an asymmetric key or a symmetric key.

1.2.10.4—The encrypted content may be communicated to and/or stored by a file server 1100 (that in some embodiments may be associated with the TP and/or the SEE 910).

1.2.10.5—A location (e.g., a URL) of the encrypted audio content (and/or the encrypted content key) may be returned from the file server 1100 to the trusted program executing with the SEE 910.

1.2.11—The program executing with the SEE 910 may communicate an insertion request to a file server 908. In some embodiments, the file server 908 may be the same file server as file server 1100. In further embodiments, the file server 908 may be a separate file server from file server 1100. The file server 908 may in some embodiments be associated with the TP and/or may be a separate data server in communication with and/or managed by the TP. The insertion request may comprise one or more of the ISCC, the location of the encrypted content file (e.g., the location of the encrypted content file in file server 1100), the encrypted content key and/or associated ID information, metadata, content creator information such as an SWID, timestamp information, and/or an IDB-W for the particular work. The access token issued to the trusted program executing within the SEE 910 may be further included in and/or communicated with the insertion request.

1.2.12—The file server 908 may forward the access token to the IIAM service 906 for authentication.

1.2.13—The IIAM service 906 may return an indication to the file server 908 indicating whether the access token was authenticated (e.g., OK and/or NG).

1.2.14—If the IIAM service 906 authenticates the access token, the data server may update the database with the information included in the insertion request. Although not specifically illustrated, in some embodiments, the data server may return a confirmation to the program executing within the SEE 910 that the database has been updated.

1.2.15—The program executing within the SEE 910 may return the IDB-W, the timestamp information, and the ISCC to the content registration service web front 904.

1.3—The content registration service web front 904 may return an indication of the IBD-W, the timestamp information, and the ISCC to the content creator and/or other rightsholder 900.

Figure 12A:
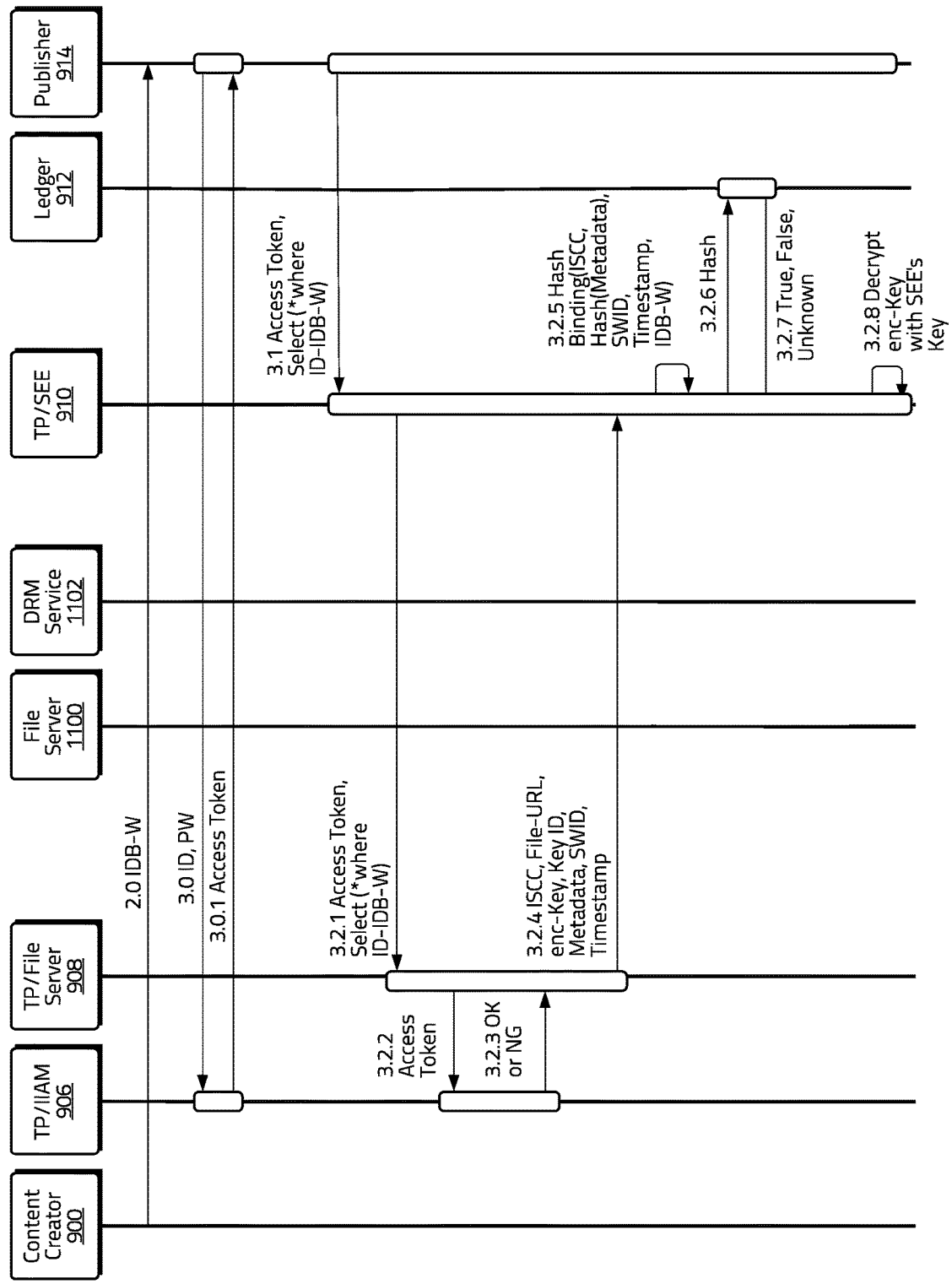
FIG. 12A illustrates a first part of an example of a key management process consistent with various embodiments of the present disclosure.
Figure 12B:
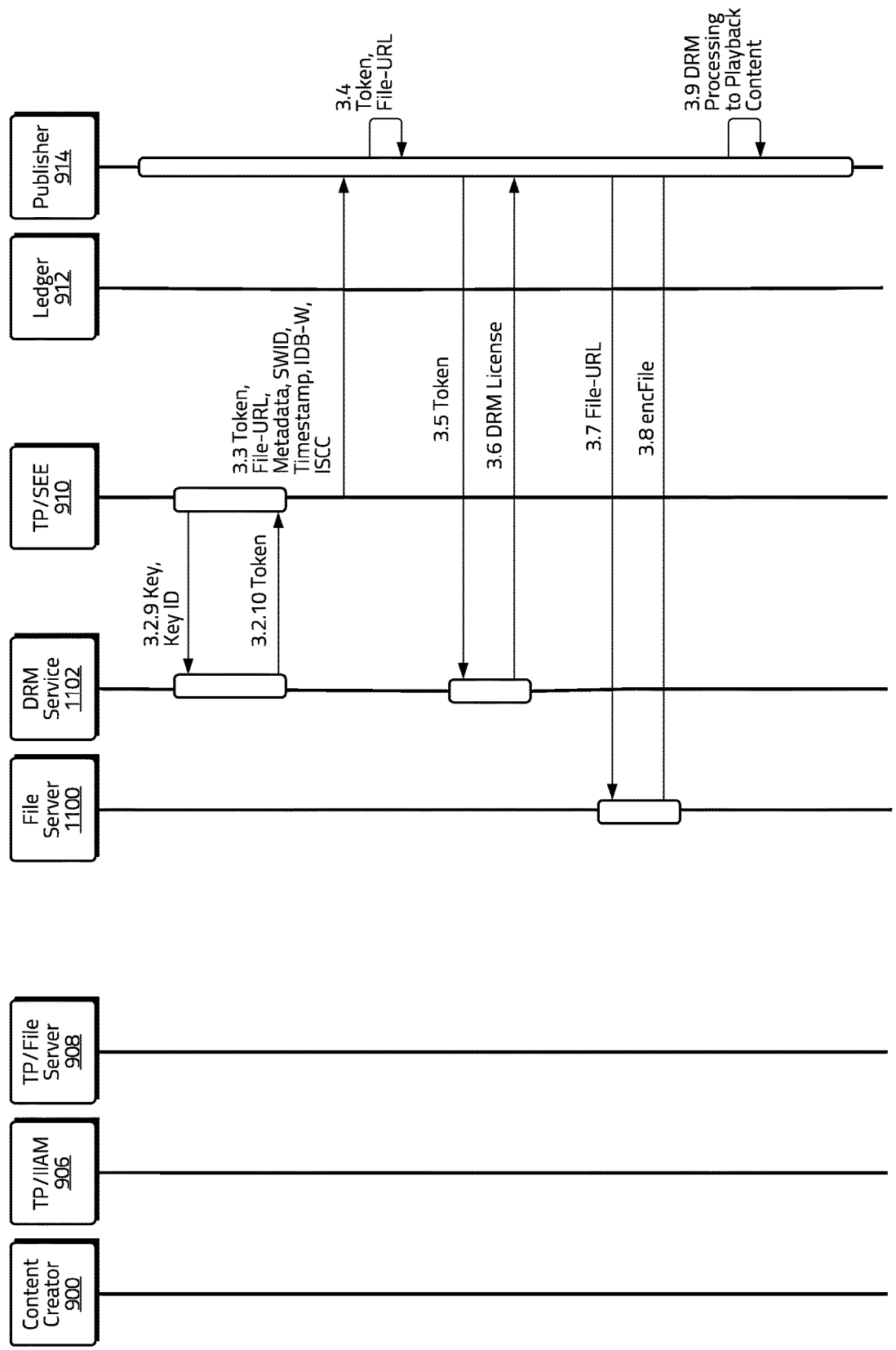
FIG. 12B illustrates a second part of an example of a key management process consistent with various embodiments of the present disclosure.

In various embodiments, content key and/or license management processes may be implemented using a DRM service 1102. For example, when an authorized publisher requests to render (e.g., stream) content, the trusted program executing within the SEE 910 of the TP may handle certain content key transactions by interacting with a DRM service 1102. FIGS. 12A-12B illustrate an example of a process for managing cryptographic keys associated with content consistent with various embodiments of the present disclosure. Referring to FIG. 12A, which illustrates a first part of a key management process, the process may include:

2.0—The content creator and/or other rightsholder 900 (e.g., a songwriter) may communicate content identification information to the publisher service 914. For example, the content creator 900 may communicate an IDB-W associated with a particular work to the publisher service 914.

3.0—The publisher service 914 may be interested in accessing the content for publication and/or authenticating certain rights and/or other information associated with the content. The publisher service 914 may provide its authentication information (e.g., ID information and/or password information) to the IIAM service 906 for authentication.

3.0.1—If the IIAM service 906 authenticates the publisher service 914, it may return an access token to the publisher service 914.

3.1—The publisher service 914 may provide the received access token along with an indication of selected and/or otherwise requested content to the program executing within the SEE 910 of the TP. In some embodiments, the indication may comprise an indication of a piece of requested audio content, metadata, the SWID, and/or the IDB-W associated with the selected/requested content.

3.2.1—The program executing within the SEE 910 may communicate the access token along with the indication of the selected and/or otherwise requested content to the file server 908. Although not specifically illustrated, the program within the SEE may also authenticate the access token of the publisher with the IIAM service 906.

3.2.2—The file server 908 may forward the publisher access token to the IIAM service for authentication.

3.2.3—The IIAM service 906 may return an indication to the file server 908 indicating whether the publisher access token was authenticated (e.g., OK and/or NG).

3.2.4—If the publisher access token was authenticated, the file server 908 may return the ISCC, a location of the content (e.g., the file URL), the associated encrypted content key and/or an associated content key ID, metadata, content creator and/or rightsholder identifier (e.g., SWID), and/or timestamp information to the trusted program executing within the SEE 910.

3.2.5—The program executing within the SEE 910 may generate a hash of a binding that comprises one or more of the ISCC, a hash of the associated content metadata, the SWID and/or other content creator and/or rightsholder identifier, the timestamp information, and the IDB-W for the particular work.

3.2.6—The hash of the binding may be communicated to the ledger service 912 for verification.

3.2.7—The ledger service 912 may return to the program executing within the SEE 910 an indication as to whether the hash is included in the ledger and/or database maintained by the ledger service (e.g., "true"), whether the hash is not included in the ledger and/or database (e.g., "false"), and/or whether there is some indication of tampering (e.g., "unknown").

3.2.8—The encrypted content key may be loaded (e.g., loaded from a database) by the trusted program executing within the SEE 910. The encrypted content key may be decrypted with the key associated with the SEE 910 and/or the trusted program.

Referring to FIG. 12B, the key management process may further include:

3.2.9—The trusted program executing within the SEE 910 may communicate the content key and associated content key ID to the DRM service 1102 to retrieve an associated token.

3.2.10—In response, the DRM service 1102 may communicate the DRM token to the program executing within the SEE 910.

3.3—The DRM token retrieved from the DRM service 1102 may be communicated to the publisher service 914 along with a location of the encrypted content file (e.g., file URL), associated metadata, content creator and/or rightsholder identification information (e.g., an SWID), the timestamp, the IDB-W, and/or the ISCC to the publisher service 914.

3.4—The publisher service 914 may feed the retrieved DRM token to a DRM client of a client application executed by the publisher service 914 (e.g., Widevine in a Chrome browser) to initiate a DRM license acquisition process with the DRM service 1102.

3.5—The DRM client of the publisher service 914 may communicate the retrieved DRM token to the DRM service 1102.

3.6—If the DRM service 1102 verifies the received DRM token, it may issue a DRM license to the publisher service 914 (e.g., to the DRM client of the publisher service 914). In some embodiments, the DRM license may comprise the content key.

3.7—The publisher service 914 may communicate a request for the content to the file server 1100. The request may include the location of the encrypted content (e.g., file URL).

3.8—The encrypted content may be returned to the publisher service 914 from the file server 1100.

3.9—The encrypted content may be decrypted using the content key included in the DRM license (possibly after complying with any other DRM license terms that may be enforced). Once decrypted, the audio content may be rendered and/or otherwise played back by the publisher service 914.

It will be appreciated that a number of variations can be made to the architecture, relationships, and examples presented in connection with FIGS. 9A-12B within the scope of the inventive body of work. For example, certain functionalities of a content creator and/or other rightsholder 900, content registration web front service 904, IDP service 902, IIAM service 906, file servers 908 and 1100, DRM service 1102, SEE 910, ledger service 912 which may be associated with a TP and/or a trusted assertion service, publisher service 914, and a PRO 1000 may be performed by and/or otherwise integrated in a single entity, system, and/or service, and/or any suitable combination of entities, systems, and/or services. Thus, it will be appreciated that the architecture, relationships, and examples presented in connection with FIGS. 9A-12B are provided for purposes of illustration and explanation, and not limitation.

Moreover, although various embodiments and/or examples are described herein in connection with applications and/or contexts involving interactions between a PRO, a trusted data management platform, a trusted assertion service, and/or a DRM service, it will be appreciated that certain disclosed embodiments may be implemented in a variety of other applications, contexts, and/or use cases. For example and without limitation, courts and/or other legal entities may seek to verify and/or ascertain certain legal and/or evidentiary facts. Parties associated with legal and/or evidentiary facts may register associated fact information with a trusted data management platform and/or a trusted assertion service. Parties wishing to securely access and/or validate such facts may interact with the trusted data management platform to identify whether associated fact information have been recorded by a trusted ledger and/or ascertain information relating to rights associated with the content. In some embodiments, a DRM service may be used to ensure that access to facts and/or associated information is provided to authorized parties (e.g., as may be used in connection with enforcing legal protective and/or confidential orders limiting access to confidential documents and/or the like).

In another non-limiting example, content may be associated with metadata that may specify various rights, royalty, and/or other payment information. Such metadata may be registered with a trusted data management platform and later verified to determine, among other things, what required royalties for publishing content are, to what entity and/or entities such royalties should be paid, how such royalties should be paid, and/or the like. In some embodiments, this may enable content publishers to determine how to directly compensate content providers for publication rights.

Figure 13:
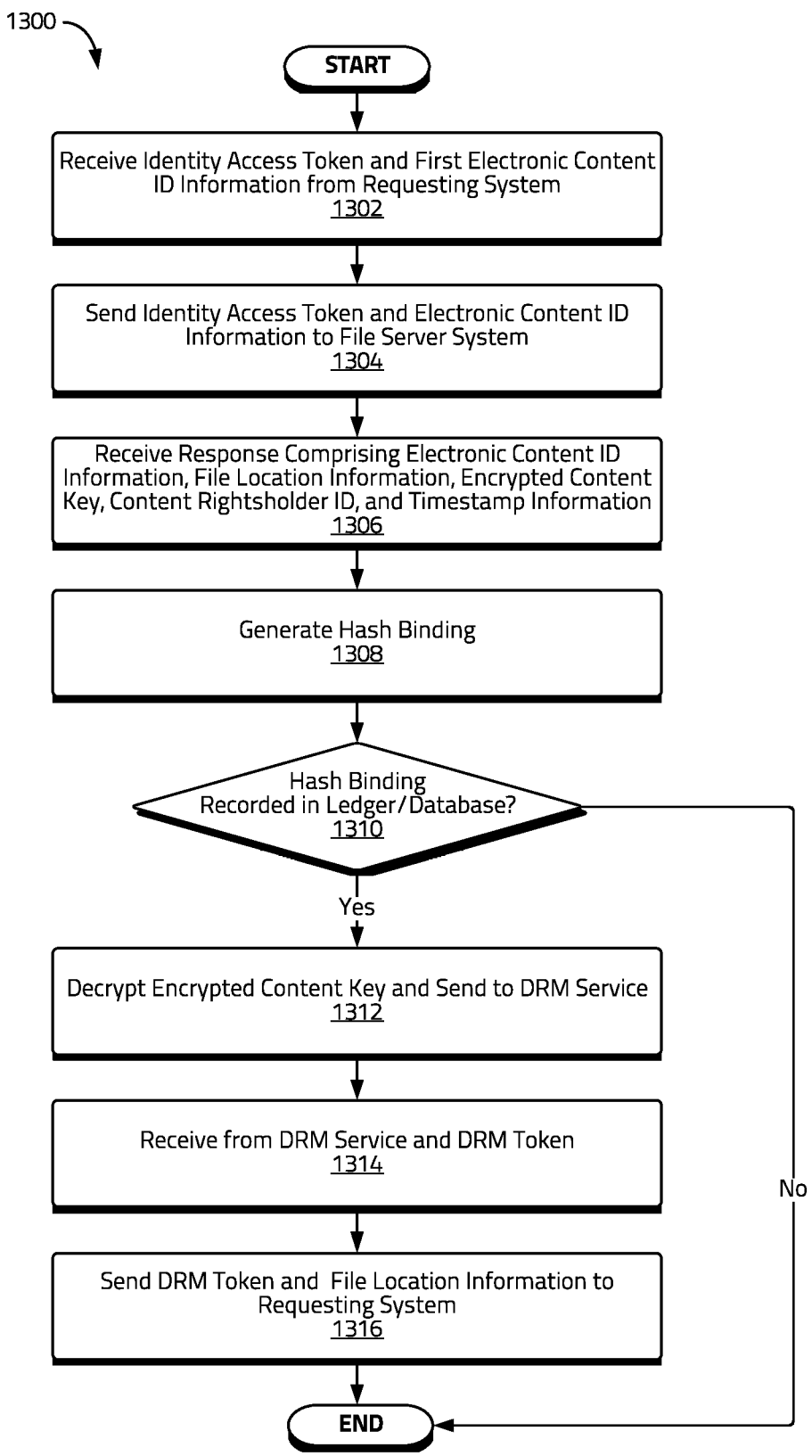
FIG. 13 illustrates a flow chart of an example of a method for managing electronic content by a trusted data management platform consistent with various embodiments of the present disclosure.

FIG. 13 illustrates a flow chart of an example of a method 1300 for managing electronic content by a trusted data management platform consistent with various embodiments of the present disclosure. The illustrated method 1300 and/or aspects thereof may be performed by and/or in conjunction with software, hardware, firmware, and/or any combination thereof. In various embodiments, the method 1300 may be performed by a trusted data management platform configured to manage access to and/or use of electronic content, which may comprise audio content, video content, text content, image content, and/or any other type of electronic content.

At 1302 a request may be received a trusted program executing in a secure environment of the trusted data management platform from a system wishing to access the electronic content. In some embodiments, the request may comprise an identity access token issued to the requesting system and first electronic content identification information associated with the electronic content the system wishes to access. The identity access token may be configured to be validated by a system using an IIAM service. In certain embodiments, the requesting system may comprise a publishing service system, although it will be appreciated that systems associated with other services and/or users may issue content access requests and participate in various aspects of the content management processes described herein.

The trusted program may send a query to a first file server system at 1304. In some embodiments, the query may comprise the received identity access token and the first electronic content identification information. In certain embodiments, the first file server system may be associated with and/or otherwise be implemented by the trusted digital management platform.

At 1306, the trusted program may receive from the first file server system a request comprising second electronic content identification information, electronic content file location information, an encrypted content key, content rightsholder identification information, and timestamp information. In further embodiments, the query may further comprise content key identification information and/or metadata information associated with the electronic content.

In certain embodiments, the electronic content file location information may comprise location information of a file corresponding to the electronic content within a file server system. The file system may comprise a second file server system which may be implemented by the same file server system as the first file server system or be implemented by a separate system.

In some embodiments, the first electronic content identification information and the second electronic content identification information may comprise the same electronic content identification information. In further embodiments, the second electronic content identification information may comprise an ISCC associated with the electronic content.

The trusted program may generate a binding comprising one or more of the first and/or second electronic content identification information, the content rightsholder identification information, the timestamp information, and/or a hash of the metadata information associated with the electronic content. A cryptographic hash of the generated binding may be generated by the trusted program at 1308.

At 1310, the trusted program may query a ledger service with the hash binding to determine whether a trusted ledger (e.g., a trusted database and/or a TIDAL) maintained by the ledger service includes the hash binding. The ledger service may be associated with the trusted data management platform and/or a trusted assertion service separate from the trusted data management platform. If the hash is included in the ledger, the trusted program may proceed to decrypt the encrypted content key with a private key associated with the trusted program and/or the secure execution environment of the trusted data management platform.

The trusted program may send the decrypted content key and/or associated content key identification information to a DRM service at 1312. At 1314, the DRM service may receive a DRM token from the DRM service. The trusted program may then send to the system wishing to access the electronic content one or more of the DRM token, electronic file location information, metadata information, timestamp information, contents rightsholder information, and/or first and/or second identification information for use in accessing the electronic content at 1316.

Figure 14:
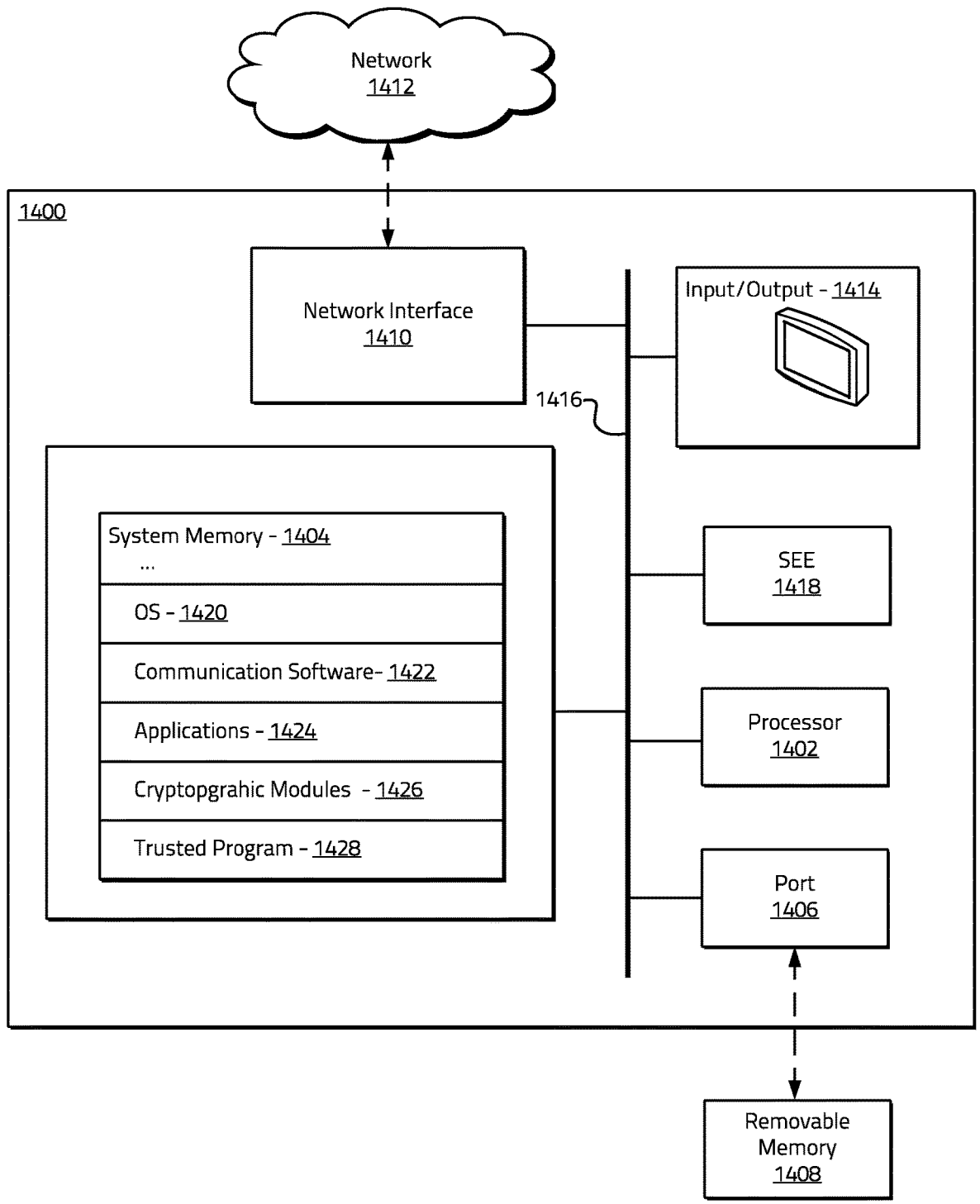
FIG. 14 illustrates an example of a system that may be used to implement certain embodiments of the systems and methods of the present disclosure.

FIG. 14 illustrates an example of a system 1400 that may be used to implement certain embodiments of the systems and methods of the present disclosure. The system 1400 of FIG. 14 and/or components illustrated in connection with the same may comprise and/or be included a system and/or service associated with a data provider, a trusted data management platform, a data processing service, a trusted assertion service, a DRM service, a data marketplace service, a data consumer system, a publishing service, and/or any other system, service, and/or device configured to implement embodiments of the disclosed systems and methods.

Various systems and/or services associated with embodiments of the disclosed systems and/or methods may be communicatively coupled using a variety of networks and/or network connections. In certain embodiments, the network may comprise a variety of network communication devices and/or channels and may utilize any suitable communications protocols and/or standards facilitating communication between the systems and/or devices. The network may comprise the Internet, a local area network, a virtual private network, and/or any other communication network utilizing one or more electronic communication technologies and/or standards (e.g., Ethernet or the like). In some embodiments, the network may comprise a wireless carrier system such as a personal communications system ("PCS"), and/or any other suitable communication system incorporating any suitable communication standards and/or protocols. In further embodiments, the network may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network may incorporate one or more satellite communication links, broadcast communication links, and/or the like. In yet further embodiments, the network may utilize IEEE's 802.11 standards, Bluetooth®, ultra-wide band ("UWB"), Zigbee®, and or any other suitable standard or standards.

Various systems and/or devices associated with the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, the client device and/or one or more other systems and/or services may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 14, a system 1400 may include: a processing unit 1402; system memory 1404, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit; a port 1406 for interfacing with removable memory 1408 that may include one or more diskettes, optical storage mediums (e.g., flash memory, thumb drives, USB dongles, compact discs, DVDs, etc.) and/or other non-transitory computer-readable storage mediums; a network interface 1410 for communicating with other systems via one or more network connections 1412 using one or more communication technologies, including any of the network connections and/or communication technologies and/or standards described herein; a user interface 1414 that may include a display and/or one or more input/output devices such as, for example, a touchscreen, a keyboard, a mouse, a track pad, and the like; and one or more busses 1416 for communicatively coupling the elements of the system.

In some embodiments, the system may, alternatively or in addition, include an SEE 1418 and/or a trusted execution environment that is protected from tampering by a user of the system or other entities by utilizing secure physical and/or virtual security techniques. An SEE 1418 and/or a TEE can help enhance the security of sensitive operations such as personal information management, trusted credential and/or key management, privacy and policy management, license management and/or enforcement, and other aspects of the systems and methods disclosed herein. In certain embodiments, the SEE 1418 and/or TEE may operate in a logically secure processing domain and be configured to protect and operate on secret information, as described herein. In some embodiments, the SPU 1418 and/or TEE may include internal memory storing executable instructions or programs configured to enable the SEE 1418 and/or TEE to perform secure operations, as described herein.

The operation of the system may be generally controlled by a processing unit 1402 and/or an SEE 1418 and/or TEE operating by executing software instructions and programs stored in the system memory 1404 (and/or other computer-readable media, such as removable memory 1408). The system memory 1404 may store a variety of executable programs or modules for controlling the operation of the system 1400. For example, the system memory 1404 may include an operating system ("OS") 1412 that may manage and coordinate, at least in part, system hardware resources and provide for common services for execution of various applications and a trust and privacy management system for implementing trust and privacy management functionality including protection and/or management of personal data through management and/or enforcement of associated policies. The system memory may further include, without limitation, communication software 1422 configured to enable in part communication with and by the system, one or more applications 1424, cryptographic modules 1426 configured to perform various cryptographic operations consistent with the disclosed embodiments, trusted program modules 1428 configured to perform various aspects of a trusted program consistent with the disclosed embodiments, and/or any other information, modules, and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, devices, services, and/or components presented in connection with the figures and/or associated description within the scope of the inventive body of work, and that the examples presented in the figures are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

What is claimed is:

1. A method for managing electronic content performed by a trusted data management platform comprising a processor and a non-transitory computer-readable medium storing instructions that, when executed by the processor, cause the trusted data management platform to perform the method, the method comprising:
   receiving, by a trusted program executing in a secure execution environment of the trusted data management platform from a system wishing to access the electronic content, an identity access token and first electronic content identification information;
   sending, by the trusted program to a first file server system, a query comprising the identity access token and the first electronic content identification information;
   receiving, by the trusted program from the first file server system, a response to the query, the response comprising second electronic content identification information, electronic content file location information, an encrypted content key, content rightsholder identification information, and timestamp information;
   generating, by the trusted program, a hash binding comprising a hash of a binding comprising one or more of the second electronic content identification information, the content rightsholder identification information, and the timestamp information;
   querying, by the trusted program, a ledger service with the hash binding to determine that a trusted ledger maintained by the ledger service includes the hash binding;
   decrypting, by the trusted program based on the determination, the encrypted content key with a private key associated with the secure execution environment;
   sending, by the trusted program, the decrypted content key to a digital rights management service;
   receiving, from the digital rights management service, a digital rights management token; and
   sending, to the system wishing to access the electronic content, the digital rights management token and the electronic file location information for use in accessing the electronic content.

2. The method of claim 1, wherein the first electronic content identification information and the second electronic content identification information comprise the same electronic content identification information.

3. The method of claim 1, wherein the second electronic content identification information comprises an International Standard Content Code associated with the electronic content.

4. The method of claim 1, wherein the response to the query received from the first file server system further comprises content key identification information.

5. The method of claim 4, wherein the method further comprises sending, by the trusted program to the digital rights management service, the content key identification information with the decrypted content key.

6. The method of claim 1, wherein the response to the query received from the first file server system further comprises metadata information associated with the electronic content.

7. The method of claim 6, wherein the binding used to generate the hash binding further comprises a hash of the metadata information associated with the electronic content.

8. The method of claim 6, wherein the method further comprises sending, by the trusted program to the system wishing to access the electronic content, one or more of the metadata information associated with the electronic content, the content rightsholder identification information, the timestamp information, the first electronic content identification information, and the second electronic content identification information.

9. The method of claim 1, wherein the binding used to generate the hash binding further comprises the first electronic content identification information.

10. The method of claim 1, wherein the electronic content file location information comprises location information of a file corresponding to the electronic content within a second file server system.

11. The method of claim 10, wherein the first file server system and the second file server system are implemented by the same file server system.

12. The method of claim 1, wherein the first file server system is associated with the trusted data management platform.

13. The method of claim 1, wherein the ledger service is associated with the trusted data management platform.

14. The method of claim 1, wherein the ledger service is associated with a trusted assertion service separate from the trusted data management platform.

15. The method of claim 1, wherein the identity access token is configured to be validated by the first file server system using an identity and access management service.

16. The method of claim 1, wherein the system wishing to access the electronic content comprises a content publication service system.

17. The method of claim 1, wherein the trusted ledger comprises a trusted immutable distributed assertion ledger.

* * * * *